US009721060B2

(12) United States Patent
Chung et al.

(10) Patent No.: US 9,721,060 B2
(45) Date of Patent: Aug. 1, 2017

(54) BEVERAGE DISPENSING SYSTEM WITH SOCIAL MEDIA CAPABILITIES

(71) Applicant: PepsiCo, Inc., Purchase, NY (US)

(72) Inventors: Terry Tae-Il Chung, New Fairfield, CT (US); Matti Phillip Leshem, Studio City, CA (US)

(73) Assignee: PepsiCo, Inc., Purchase, NY (US)

( * ) Notice: Subject to any disclaimer, the term of this patent is extended or adjusted under 35 U.S.C. 154(b) by 146 days.

(21) Appl. No.: 13/692,447

(22) Filed: Dec. 3, 2012

(65) Prior Publication Data

US 2013/0096715 A1 Apr. 18, 2013

Related U.S. Application Data

(63) Continuation of application No. 13/451,948, filed on Apr. 20, 2012, now abandoned.

(60) Provisional application No. 61/478,425, filed on Apr. 22, 2011.

(51) Int. Cl.
| | |
|---|---|
| *G06Q 20/32* | (2012.01) |
| *G06F 17/00* | (2006.01) |
| *G06Q 20/38* | (2012.01) |
| *G06Q 30/02* | (2012.01) |

(52) U.S. Cl.
CPC ........... *G06F 17/606* (2013.01); *G06Q 20/32* (2013.01); *G06Q 20/387* (2013.01); *G06Q 30/02* (2013.01)

(58) Field of Classification Search
CPC .. A47J 31/00; A47J 31/40; A47J 31/41; G06F 17/00; G06F 17/606; G06Q 20/32; G06Q 20/387; G06Q 30/02; B67D 1/00; B67D 1/002; B67D 2210/00089; B67D 2210/00065; G07F 13/065; G07F 11/002; G07F 7/025; G07F 13/10; G07F 13/06
USPC ....................................................... 705/14.26
See application file for complete search history.

(56) References Cited

U.S. PATENT DOCUMENTS

| | | |
|---|---|---|
| 2,949,993 A | 8/1960 | Adler |
| 3,184,714 A | 5/1965 | Brown, Jr. |
| 3,242,929 A | 3/1966 | Adams |
| 3,254,749 A | 6/1966 | Scherer |

(Continued)

FOREIGN PATENT DOCUMENTS

| | | |
|---|---|---|
| DE | 202009015375 U1 | 4/2010 |
| DE | 202010001631 U1 | 5/2010 |

(Continued)

OTHER PUBLICATIONS

"Statement in Accordance with the Notice from the European Patent Office," dated Oct. 1, 2007.

(Continued)

*Primary Examiner* — Fonya Long
*Assistant Examiner* — Rashida Robinson Shorter
(74) *Attorney, Agent, or Firm* — Sterne, Kessler, Goldstein & Fox P.L.L.C.

(57) ABSTRACT

A method is provided comprising receiving instructions at a first device. The instructions may correspond to an item transaction. The item may be a food product. The item transaction may comprise an item gift. The method may comprise generating a code based on the instructions received at the first device for the item transaction. The method may comprise generating a message at the first device. The method may comprise transmitting the code and the message from the first device to a second device.

24 Claims, 17 Drawing Sheets

(56) References Cited

U.S. PATENT DOCUMENTS

| | | |
|---|---|---|
| 3,357,530 A | 12/1967 | Yamamoto |
| 3,379,295 A | 4/1968 | Varley |
| 3,397,763 A | 8/1968 | Wahlberg |
| 3,445,633 A | 5/1969 | Ratner |
| 3,448,895 A | 6/1969 | Mesh |
| 3,653,480 A | 4/1972 | Yamamoto et al. |
| 3,786,421 A | 1/1974 | Wostl et al. |
| 3,790,957 A | 2/1974 | Dukes et al. |
| 3,896,915 A | 7/1975 | Hayashi et al. |
| 3,935,933 A | 2/1976 | Tanaka et al. |
| 3,984,660 A | 10/1976 | Oka et al. |
| 4,124,109 A | 11/1978 | Bissell et al. |
| 4,171,737 A | 10/1979 | McLaughlin |
| 4,185,730 A | 1/1980 | Roes et al. |
| 4,199,100 A | 4/1980 | Wostl et al. |
| 4,271,351 A | 6/1981 | Bloodworth |
| 4,276,999 A | 7/1981 | Reichenberger |
| 4,377,049 A | 3/1983 | Simon et al. |
| 4,411,351 A | 10/1983 | Lowder et al. |
| 4,412,292 A | 10/1983 | Sedam et al. |
| 4,450,535 A | 5/1984 | de Pommery et al. |
| 4,469,150 A | 9/1984 | Grimaldi |
| 4,487,333 A | 12/1984 | Pounder et al. |
| 4,499,982 A | 2/1985 | Sugimoto et al. |
| 4,499,985 A | 2/1985 | Schuller |
| 4,529,968 A | 7/1985 | Hilsum et al. |
| 4,549,675 A | 10/1985 | Austin |
| 4,554,419 A | 11/1985 | King et al. |
| 4,568,785 A | 2/1986 | Jaecker |
| 4,658,988 A | 4/1987 | Hassell |
| 4,674,041 A | 6/1987 | Lemon et al. |
| 4,747,516 A | 5/1988 | Baker |
| 4,766,548 A | 8/1988 | Cedrone et al. |
| 4,777,354 A | 10/1988 | Thomas |
| 4,812,629 A | 3/1989 | O'Neil et al. |
| 4,817,689 A | 4/1989 | Stembridge et al. |
| 4,821,925 A | 4/1989 | Wiley et al. |
| 4,827,426 A | 5/1989 | Patton et al. |
| 4,866,190 A | 9/1989 | Tordeux et al. |
| 4,866,661 A | 9/1989 | de Prins |
| 4,882,675 A | 11/1989 | Nichtberger et al. |
| 4,900,906 A | 2/1990 | Pusic |
| 4,947,028 A | 8/1990 | Gorog |
| 4,961,447 A | 10/1990 | Credle, Jr. et al. |
| 4,967,808 A | 11/1990 | Credle, Jr. et al. |
| 4,971,120 A | 11/1990 | Credle, Jr. et al. |
| 4,977,300 A | 12/1990 | Schroeder |
| 4,979,639 A | 12/1990 | Hoover et al. |
| 4,979,641 A | 12/1990 | Turner |
| 5,047,613 A | 9/1991 | Swegen et al. |
| 5,062,555 A | 11/1991 | Whigham et al. |
| 5,074,341 A | 12/1991 | Credle, Jr. et al. |
| 5,091,713 A | 2/1992 | Horne et al. |
| 5,095,710 A | 3/1992 | Black et al. |
| 5,102,011 A | 4/1992 | Whigham et al. |
| 5,103,649 A | 4/1992 | Kieffer |
| 5,113,974 A | 5/1992 | Vayda |
| 5,147,021 A | 9/1992 | Maruyama et al. |
| 5,201,395 A | 4/1993 | Takizawa et al. |
| 5,206,488 A | 4/1993 | Teicher |
| 5,212,954 A | 5/1993 | Black et al. |
| 5,235,509 A | 8/1993 | Mueller et al. |
| 5,243,174 A | 9/1993 | Veeneman et al. |
| 5,290,033 A | 3/1994 | Bittner et al. |
| 5,367,452 A | 11/1994 | Gallery et al. |
| 5,409,092 A | 4/1995 | Itako et al. |
| 5,420,406 A | 5/1995 | Izawa et al. |
| 5,442,567 A | 8/1995 | Small |
| 5,450,938 A | 9/1995 | Rademacher |
| 5,454,406 A | 10/1995 | Rejret et al. |
| 5,491,326 A | 2/1996 | Marceau et al. |
| 5,499,330 A | 3/1996 | Lucas et al. |
| 5,500,514 A | 3/1996 | Veeneman et al. |
| 5,513,117 A | 4/1996 | Small |
| 5,520,275 A | 5/1996 | Foglino |
| 5,546,303 A | 8/1996 | Helbling |
| 5,555,497 A | 9/1996 | Helbling |
| 5,567,926 A | 10/1996 | Asher et al. |
| 5,588,557 A | 12/1996 | Topar |
| 5,621,874 A | 4/1997 | Lucas et al. |
| 5,625,562 A | 4/1997 | Veeneman et al. |
| 5,652,421 A | 7/1997 | Veeneman et al. |
| 5,657,388 A | 8/1997 | Weiss |
| 5,685,435 A | 11/1997 | Picioccio et al. |
| 5,731,981 A | 3/1998 | Simard |
| 5,748,908 A | 5/1998 | Yu |
| 5,754,981 A | 5/1998 | Veeneman et al. |
| D395,297 S | 6/1998 | Cheng et al. |
| 5,774,874 A | 6/1998 | Veeneman et al. |
| D398,299 S | 9/1998 | Ballay et al. |
| 5,803,320 A | 9/1998 | Cutting et al. |
| 5,816,443 A | 10/1998 | Bustos |
| 5,836,481 A | 11/1998 | Strohmeyer et al. |
| 5,880,733 A | 3/1999 | Horvitz et al. |
| 5,898,435 A | 4/1999 | Nagahara et al. |
| 5,905,992 A | 5/1999 | Lucas et al. |
| 5,907,141 A | 5/1999 | Deaville et al. |
| 5,912,668 A | 6/1999 | Sciammarella et al. |
| 5,923,413 A | 7/1999 | Laskowski |
| 5,947,334 A | 9/1999 | Rudick et al. |
| 5,959,869 A | 9/1999 | Miller et al. |
| 5,960,997 A | 10/1999 | Forsythe |
| 5,963,203 A | 10/1999 | Goldberg et al. |
| 5,967,367 A | 10/1999 | Orsborn |
| 5,984,180 A | 11/1999 | Albrecht |
| 5,997,236 A | 12/1999 | Picioccio et al. |
| 6,021,362 A | 2/2000 | Maggard et al. |
| 6,021,626 A | 2/2000 | Goodman |
| 6,047,807 A | 4/2000 | Molbak |
| 6,053,359 A | 4/2000 | Goulet et al. |
| 6,054,989 A | 4/2000 | Robertson et al. |
| 6,056,194 A | 5/2000 | Kolls |
| 6,073,840 A | 6/2000 | Marion |
| 6,078,888 A | 6/2000 | Johnson, Jr. |
| 6,098,879 A | 8/2000 | Terranova |
| 6,101,266 A | 8/2000 | Laskowski et al. |
| 6,119,135 A | 9/2000 | Helfman |
| 6,138,106 A | 10/2000 | Walker et al. |
| 6,144,366 A | 11/2000 | Numazaki et al. |
| 6,158,655 A | 12/2000 | DeVries, Jr. et al. |
| 6,160,899 A | 12/2000 | Lee et al. |
| 6,176,782 B1 | 1/2001 | Lyons et al. |
| 6,182,895 B1 | 2/2001 | Albrecht |
| 6,193,154 B1 | 2/2001 | Phillips et al. |
| 6,198,483 B1 | 3/2001 | Launais |
| 6,230,150 B1 | 5/2001 | Walker et al. |
| 6,236,736 B1 | 5/2001 | Crabtree et al. |
| 6,240,397 B1 | 5/2001 | Sachs |
| 6,256,046 B1 | 7/2001 | Waters et al. |
| 6,293,469 B1 | 9/2001 | Masson et al. |
| 6,315,197 B1 | 11/2001 | Beardsley |
| 6,321,802 B1 | 11/2001 | Weeks et al. |
| D459,361 S | 6/2002 | Inagaki |
| 6,419,161 B1 | 7/2002 | Haddad et al. |
| 6,439,454 B1 | 8/2002 | Masson et al. |
| 6,457,038 B1 | 9/2002 | Defosse |
| 6,466,237 B1 | 10/2002 | Miyao et al. |
| 6,478,192 B2 | 11/2002 | Heyes |
| 6,484,863 B1 | 11/2002 | Molbak |
| 6,493,970 B1 | 12/2002 | McCarthy et al. |
| 6,494,776 B1 | 12/2002 | Molbak |
| 6,570,582 B1 | 5/2003 | Sciammarella et al. |
| 6,573,983 B1 | 6/2003 | Laskowski |
| 6,584,309 B1 | 6/2003 | Whigham |
| 6,602,125 B2 | 8/2003 | Martin |
| 6,633,849 B1 | 10/2003 | Dodd |
| 6,658,323 B2 | 12/2003 | Tedesco et al. |
| 6,669,088 B2 | 12/2003 | Veeneman |
| 6,681,031 B2 | 1/2004 | Cohen et al. |
| 6,722,573 B2 | 4/2004 | Haddad et al. |
| 6,729,957 B2 | 5/2004 | Burns et al. |
| 6,729,958 B2 | 5/2004 | Burns et al. |
| 6,736,251 B2 | 5/2004 | Molbak |
| 6,736,725 B2 | 5/2004 | Burns et al. |

(56) References Cited

U.S. PATENT DOCUMENTS

| | | |
|---|---|---|
| 6,746,330 B2 | 6/2004 | Cannon |
| 6,758,316 B2 | 7/2004 | Molbak |
| 6,774,986 B2 | 8/2004 | Laskowski |
| 6,784,874 B1 | 8/2004 | Shimizu |
| 6,793,130 B2 | 9/2004 | Veeneman |
| 6,801,637 B2 | 10/2004 | Voronka et al. |
| 6,834,452 B2 | 12/2004 | Martin et al. |
| 6,854,581 B2 | 2/2005 | Molbak |
| 6,950,534 B2 | 9/2005 | Cohen et al. |
| 6,954,732 B1 | 10/2005 | DeLapa et al. |
| 6,957,125 B1 | 10/2005 | Rifkin |
| 6,976,570 B2 | 12/2005 | Molbak |
| 7,010,594 B2 | 3/2006 | Defosse |
| 7,013,337 B2 | 3/2006 | Defosse et al. |
| 7,020,680 B2 | 3/2006 | Defosse |
| 7,028,827 B1 | 4/2006 | Molbak et al. |
| 7,031,804 B2 | 4/2006 | Brooke, Jr. et al. |
| 7,036,094 B1 | 4/2006 | Cohen et al. |
| 7,051,291 B2 | 5/2006 | Sciammarella et al. |
| 7,065,710 B2 | 6/2006 | Hayashi et al. |
| 7,131,580 B2 | 11/2006 | Molbak |
| 7,139,006 B2 | 11/2006 | Wittenburg et al. |
| 7,164,884 B2 | 1/2007 | Defosse et al. |
| 7,167,892 B2 | 1/2007 | Defosse et al. |
| 7,171,451 B2 | 1/2007 | Defosse |
| 7,181,501 B2 | 2/2007 | Defosse |
| 7,194,422 B1 | 3/2007 | St. John Killick |
| 7,231,372 B1 | 6/2007 | Prange et al. |
| 7,268,692 B1 | 9/2007 | Lieberman |
| D555,663 S | 11/2007 | Nagata et al. |
| 7,302,156 B1 | 11/2007 | Lieberman |
| D556,770 S | 12/2007 | O'Donnell et al. |
| 7,303,119 B2 | 12/2007 | Molbak |
| 7,315,828 B1 | 1/2008 | McCarthy et al. |
| 7,330,035 B2 | 2/2008 | Van Berkel |
| 7,333,095 B1 | 2/2008 | Lieberman et al. |
| 7,333,602 B2 | 2/2008 | Habu |
| 7,350,158 B2 | 3/2008 | Yamaguchi et al. |
| D571,821 S | 6/2008 | Amacker |
| D573,605 S | 7/2008 | Amacker |
| 7,419,425 B1 | 9/2008 | Crowder, Jr. et al. |
| 7,434,177 B1 | 10/2008 | Ording et al. |
| 7,437,005 B2 | 10/2008 | Drucker et al. |
| 7,445,133 B2 | 11/2008 | Ludovissie et al. |
| 7,446,784 B2 | 11/2008 | Crew et al. |
| 7,454,363 B1 | 11/2008 | Rowe |
| 7,460,690 B2 | 12/2008 | Cohen et al. |
| 7,464,802 B2 | 12/2008 | Gerrity et al. |
| 7,468,785 B2 | 12/2008 | Lieberman |
| 7,477,241 B2 | 1/2009 | Lieberman et al. |
| 7,503,014 B2 | 3/2009 | Tojo et al. |
| 7,513,417 B2 | 4/2009 | Burns et al. |
| 7,520,374 B2 | 4/2009 | Martin et al. |
| D591,765 S | 5/2009 | Amacker |
| 7,527,193 B2 | 5/2009 | Molbak |
| 7,536,654 B2 | 5/2009 | Anthony et al. |
| D594,026 S | 6/2009 | Ball et al. |
| 7,559,460 B2 | 7/2009 | Burns et al. |
| 7,564,469 B2 | 7/2009 | Cohen |
| D598,466 S | 8/2009 | Hirsch et al. |
| 7,573,465 B2 | 8/2009 | Lieberman et al. |
| 7,577,496 B2 | 8/2009 | Walker et al. |
| 7,581,186 B2 | 8/2009 | Dowdy et al. |
| D599,367 S | 9/2009 | Mays et al. |
| D599,368 S | 9/2009 | Kanga et al. |
| D599,370 S | 9/2009 | Murchie et al. |
| D599,806 S | 9/2009 | Brown et al. |
| 7,584,883 B2 | 9/2009 | Meek et al. |
| 7,593,867 B2 | 9/2009 | Deakin et al. |
| 7,603,321 B2 | 10/2009 | Gurvey |
| D603,415 S | 11/2009 | Lin et al. |
| D605,200 S | 12/2009 | Sakai |
| 7,624,895 B2 | 12/2009 | Haskayne |
| 7,627,496 B2 * | 12/2009 | Walker .................. G06Q 20/02 705/16 |
| 7,636,679 B2 | 12/2009 | Song et al. |
| D608,365 S | 1/2010 | Walsh et al. |
| 7,653,599 B2 | 1/2010 | Doran et al. |
| D609,243 S | 2/2010 | Song |
| D609,715 S | 2/2010 | Chaudhri |
| 7,654,452 B2 | 2/2010 | Gravelle |
| 7,668,340 B2 | 2/2010 | Cohen et al. |
| D611,053 S | 3/2010 | Kanga et al. |
| D611,484 S | 3/2010 | Mays et al. |
| D611,485 S | 3/2010 | Marashi |
| 7,684,592 B2 | 3/2010 | Paul et al. |
| 7,685,163 B2 | 3/2010 | Chaudhri |
| D613,300 S | 4/2010 | Chaudhri |
| D614,640 S | 4/2010 | Viegers et al. |
| D615,098 S | 5/2010 | Winjum |
| D615,989 S | 5/2010 | Chaudhri |
| D616,458 S | 5/2010 | Pearson et al. |
| D616,459 S | 5/2010 | Pearson et al. |
| D616,460 S | 5/2010 | Pearson et al. |
| 7,720,709 B1 | 5/2010 | Langer et al. |
| 7,747,522 B1 | 6/2010 | Walker et al. |
| 7,781,722 B2 | 8/2010 | Lieberman et al. |
| 7,783,532 B2 | 8/2010 | Hsu et al. |
| 7,797,641 B2 | 9/2010 | Karukka et al. |
| D624,927 S | 10/2010 | Allen et al. |
| D624,932 S | 10/2010 | Chaudhri |
| 7,806,294 B2 | 10/2010 | Gatipon et al. |
| 7,810,676 B2 | 10/2010 | Romanyszyn et al. |
| 7,813,834 B2 | 10/2010 | Sudolcan et al. |
| D628,210 S | 11/2010 | Luke et al. |
| 7,865,432 B2 | 1/2011 | Doran et al. |
| 7,874,478 B2 | 1/2011 | Molbak |
| 7,885,726 B2 | 2/2011 | Walker et al. |
| 7,889,182 B2 | 2/2011 | Romanyszyn et al. |
| 7,895,120 B2 | 2/2011 | Walker et al. |
| D633,920 S | 3/2011 | Luke et al. |
| D634,750 S | 3/2011 | Loretan et al. |
| D634,753 S | 3/2011 | Loretan et al. |
| 7,912,580 B2 | 3/2011 | Walker et al. |
| D636,785 S | 4/2011 | Brinda |
| D637,198 S | 5/2011 | Furuya et al. |
| D637,606 S | 5/2011 | Luke et al. |
| D638,432 S | 5/2011 | Flik et al. |
| 7,941,758 B2 | 5/2011 | Tremblay |
| 7,966,577 B2 | 6/2011 | Chaudhri et al. |
| 7,979,809 B2 | 7/2011 | Sunday |
| 8,103,378 B2 * | 1/2012 | Crisp, III .................. 700/236 |
| 2001/0011365 A1 | 8/2001 | Helfman |
| 2001/0018808 A1 | 9/2001 | Bar-Yona |
| 2001/0021920 A1 | 9/2001 | Ikeda |
| 2001/0024512 A1 | 9/2001 | Yoronka et al. |
| 2001/0042121 A1 | 11/2001 | Defosse et al. |
| 2001/0047410 A1 | 11/2001 | Defosse |
| 2001/0054083 A1 | 12/2001 | Defosse |
| 2002/0016829 A1 | 2/2002 | Defosse |
| 2002/0023027 A1 | 2/2002 | Simonds |
| 2002/0054164 A1 | 5/2002 | Uemura |
| 2002/0091569 A1 | 7/2002 | Kitaura et al. |
| 2002/0107610 A1 | 8/2002 | Kaehler et al. |
| 2002/0161476 A1 | 10/2002 | Panofsky et al. |
| 2002/0194387 A1 | 12/2002 | Defosse |
| 2003/0003865 A1 | 1/2003 | Defosse et al. |
| 2003/0028284 A1 | 2/2003 | Chirnomas |
| 2003/0055735 A1 | 3/2003 | Cameron et al. |
| 2003/0097474 A1 | 5/2003 | Defosse et al. |
| 2003/0138130 A1 | 7/2003 | Cohen et al. |
| 2003/0146905 A1 | 8/2003 | Pihlaja |
| 2003/0150146 A1 | 8/2003 | Martin et al. |
| 2003/0164856 A1 | 9/2003 | Prager et al. |
| 2003/0195816 A1 | 10/2003 | Dziaba et al. |
| 2004/0078332 A1 | 4/2004 | Ferguson et al. |
| 2004/0100479 A1 | 5/2004 | Nakano et al. |
| 2004/0128257 A1 | 7/2004 | Okamoto et al. |
| 2004/0133653 A1 | 7/2004 | Defosse et al. |
| 2004/0155907 A1 | 8/2004 | Yamaguchi et al. |
| 2004/0161132 A1 | 8/2004 | Cohen et al. |
| 2004/0211210 A1 | 10/2004 | Crisp |
| 2004/0217124 A1 | 11/2004 | Crisp |
| 2004/0237048 A1 | 11/2004 | Tojo et al. |

(56) References Cited

U.S. PATENT DOCUMENTS

| | | |
|---|---|---|
| 2004/0250217 A1 | 12/2004 | Tojo et al. |
| 2004/0255254 A1 | 12/2004 | Weingart et al. |
| 2005/0044485 A1 | 2/2005 | Mondry et al. |
| 2005/0105772 A1 | 5/2005 | Voronka et al. |
| 2005/0107912 A1 | 5/2005 | Martin et al. |
| 2005/0108158 A1 | 5/2005 | Prisant |
| 2005/0154675 A1 | 7/2005 | Johnson |
| 2005/0182678 A1 | 8/2005 | Walker et al. |
| 2005/0251287 A1 | 11/2005 | Thornton et al. |
| 2006/0013440 A1 | 1/2006 | Cohen et al. |
| 2006/0059426 A1 | 3/2006 | Ogikubo |
| 2006/0069997 A1 | 3/2006 | Hsieh et al. |
| 2006/0081653 A1* | 4/2006 | Boland et al. ............... 222/243 |
| 2006/0095338 A1 | 5/2006 | Seidel |
| 2006/0109283 A1 | 5/2006 | Shipman et al. |
| 2006/0116167 A1 | 6/2006 | Raviv et al. |
| 2006/0161473 A1 | 7/2006 | Defosse |
| 2006/0167967 A1 | 7/2006 | Defosse |
| 2006/0183422 A1 | 8/2006 | Defosse et al. |
| 2006/0208851 A1* | 9/2006 | Tsunoda ........................ 340/5.9 |
| 2006/0210112 A1 | 9/2006 | Cohen et al. |
| 2006/0214953 A1 | 9/2006 | Crew et al. |
| 2006/0218041 A1 | 9/2006 | Mamedrzaev |
| 2007/0050083 A1 | 3/2007 | Signorelli et al. |
| 2007/0067738 A1 | 3/2007 | Flynt et al. |
| 2007/0083287 A1 | 4/2007 | Defosse et al. |
| 2007/0083911 A1 | 4/2007 | Madden et al. |
| 2007/0097234 A1 | 5/2007 | Katayama |
| 2007/0112907 A1 | 5/2007 | Defosse |
| 2007/0114244 A1 | 5/2007 | Gatipon et al. |
| 2007/0210153 A1 | 9/2007 | Walker et al. |
| 2007/0211031 A1 | 9/2007 | Marc |
| 2007/0240079 A1 | 10/2007 | Flynt et al. |
| 2007/0287541 A1 | 12/2007 | George et al. |
| 2008/0004983 A1* | 1/2008 | Cohn ............................. 705/26 |
| 2008/0013913 A1 | 1/2008 | Lieberman et al. |
| 2008/0033824 A1 | 2/2008 | Packes et al. |
| 2008/0052090 A1 | 2/2008 | Heinemann et al. |
| 2008/0062141 A1 | 3/2008 | Chandhri |
| 2008/0066016 A1 | 3/2008 | Dowdy et al. |
| 2008/0068353 A1 | 3/2008 | Lieberman et al. |
| 2008/0093542 A1 | 4/2008 | Lieberman et al. |
| 2008/0122870 A1 | 5/2008 | Brodersen et al. |
| 2008/0126261 A1 | 5/2008 | Lovett |
| 2008/0153567 A1 | 6/2008 | Juds et al. |
| 2008/0172306 A1 | 7/2008 | Schorr et al. |
| 2008/0173707 A1 | 7/2008 | Walker et al. |
| 2008/0192015 A1 | 8/2008 | Lieberman |
| 2008/0255942 A1* | 10/2008 | Craft ............................. 705/14 |
| 2008/0256494 A1 | 10/2008 | Greenfield |
| 2008/0262648 A1 | 10/2008 | Kriston et al. |
| 2008/0263452 A1 | 10/2008 | Tomkins |
| 2008/0282202 A1 | 11/2008 | Sunday |
| 2009/0002335 A1 | 1/2009 | Chaudhri |
| 2009/0021665 A1 | 1/2009 | Shiao et al. |
| 2009/0024530 A1 | 1/2009 | Porter et al. |
| 2009/0065570 A1* | 3/2009 | Peters et al. ............... 235/378 |
| 2009/0069931 A1* | 3/2009 | Peters et al. ............... 700/236 |
| 2009/0069934 A1 | 3/2009 | Newman et al. |
| 2009/0070234 A1 | 3/2009 | Peters et al. |
| 2009/0074248 A1 | 3/2009 | Cohen et al. |
| 2009/0084269 A1 | 4/2009 | Pozzari et al. |
| 2009/0100383 A1 | 4/2009 | Sunday et al. |
| 2009/0120958 A1 | 5/2009 | Landers et al. |
| 2009/0141614 A1 | 6/2009 | Tanaka et al. |
| 2009/0160791 A1 | 6/2009 | Lieberman |
| 2009/0166375 A1 | 7/2009 | Butler et al. |
| 2009/0171804 A1 | 7/2009 | Lee et al. |
| 2009/0189873 A1 | 7/2009 | Peterson et al. |
| 2009/0198592 A1 | 8/2009 | Emerson |
| 2009/0200453 A1 | 8/2009 | Lieberman et al. |
| 2009/0204473 A1 | 8/2009 | Sommerfeld |
| 2009/0216575 A1 | 8/2009 | Antao et al. |
| 2009/0216665 A1 | 8/2009 | Merwarth et al. |
| 2009/0216675 A1 | 8/2009 | Antao et al. |
| 2009/0222300 A1 | 9/2009 | Guith et al. |
| 2009/0222301 A1 | 9/2009 | Phillips et al. |
| 2009/0222339 A1 | 9/2009 | Antao et al. |
| 2009/0274339 A9 | 11/2009 | Cohen et al. |
| 2009/0313139 A1 | 12/2009 | Nam et al. |
| 2009/0315740 A1 | 12/2009 | Hildreth et al. |
| 2009/0322678 A1 | 12/2009 | Lashina et al. |
| 2010/0004781 A1 | 1/2010 | Walker et al. |
| 2010/0005427 A1 | 1/2010 | Zhang et al. |
| 2010/0007601 A1 | 1/2010 | Lashina et al. |
| 2010/0030355 A1 | 2/2010 | Insolia et al. |
| 2010/0036528 A1 | 2/2010 | Minard et al. |
| 2010/0082448 A1 | 4/2010 | Lin et al. |
| 2010/0084426 A1 | 4/2010 | Devers et al. |
| 2010/0100236 A1 | 4/2010 | Segal et al. |
| 2010/0103131 A1 | 4/2010 | Segal et al. |
| 2010/0114991 A1 | 5/2010 | Chaudhary et al. |
| 2010/0125362 A1 | 5/2010 | Canora et al. |
| 2010/0155415 A1 | 6/2010 | Ashrafzadeh et al. ........ 222/1 |
| 2010/0170916 A1* | 7/2010 | Segers ............................. 222/1 |
| 2010/0191369 A1 | 7/2010 | Kim |
| 2010/0217685 A1 | 8/2010 | Melcher et al. |
| 2010/0226531 A1 | 9/2010 | Goto |
| 2010/0234986 A1 | 9/2010 | Clopton et al. |
| 2010/0241999 A1 | 9/2010 | Russ et al. |
| 2010/0250372 A1 | 9/2010 | Smith et al. |
| 2010/0253637 A1 | 10/2010 | Lieberman et al. |
| 2010/0262282 A1 | 10/2010 | Segal et al. |
| 2010/0268792 A1 | 10/2010 | Butler et al. |
| 2010/0275267 A1 | 10/2010 | Walker et al. |
| 2010/0280921 A1 | 11/2010 | Stone et al. |
| 2010/0295772 A1 | 11/2010 | Alameh et al. |
| 2010/0295773 A1 | 11/2010 | Alameh et al. |
| 2010/0295781 A1 | 11/2010 | Alameh et al. |
| 2010/0299642 A1 | 11/2010 | Merrell et al. |
| 2010/0309169 A1 | 12/2010 | Lieberman et al. |
| 2010/0318225 A1 | 12/2010 | Claesson et al. |
| 2011/0022225 A1 | 1/2011 | Rothschild |
| 2011/0055718 A1 | 3/2011 | Tanaka et al. |
| 2011/0065498 A1* | 3/2011 | Barcelou ........................ 463/25 |
| 2011/0168290 A1 | 7/2011 | Breitenbach et al. |
| 2011/0172814 A1 | 7/2011 | Breitenbach et al. |
| 2011/0172848 A1 | 7/2011 | Breitenbach et al. |
| 2011/0173041 A1 | 7/2011 | Breitenbach et al. |
| 2011/0173082 A1 | 7/2011 | Breitenbach et al. |
| 2011/0192495 A1* | 8/2011 | Deo et al. ........................ 141/95 |
| 2011/0264285 A1* | 10/2011 | Mattos et al. ............... 700/283 |
| 2012/0150600 A1* | 6/2012 | Isaacson et al. ........... 705/14.23 |
| 2012/0245987 A1* | 9/2012 | Isaacson et al. ........... 705/14.23 |
| 2013/0087050 A1* | 4/2013 | Studor et al. .................. 99/285 |

FOREIGN PATENT DOCUMENTS

| | | |
|---|---|---|
| EP | 546782 A1 | 6/1993 |
| EP | 989091 A1 | 3/2000 |
| EP | 2117122 A1 | 11/2009 |
| FR | 2624844 A1 | 6/1989 |
| FR | 2847357 A1 | 5/2004 |
| FR | 2853423 A1 | 10/2004 |
| FR | 2887659 A1 | 12/2006 |
| FR | 2887660 A1 | 12/2006 |
| GB | 2077063 A | 12/1981 |
| GB | 2101088 A | 1/1983 |
| GB | 2451646 A | 2/2009 |
| JP | H05-151450 A | 6/1993 |
| JP | 2000172916 A | 6/2000 |
| JP | 2000276649 A | 10/2000 |
| JP | 2002-140756 A | 5/2002 |
| JP | 2004-046476 A | 2/2004 |
| JP | 2006264733 A | 10/2006 |
| JP | 07285597 | 5/2009 |
| JP | 2010063793 A | 3/2010 |
| JP | 2010067185 A | 3/2010 |
| WO | 9117949 A1 | 11/1991 |
| WO | 9212489 A1 | 7/1992 |
| WO | 9215968 A1 | 9/1992 |
| WO | 9218954 A1 | 10/1992 |
| WO | 9307085 A1 | 4/1993 |
| WO | 9412953 A1 | 6/1994 |

(56) References Cited

FOREIGN PATENT DOCUMENTS

| WO | 9427226 A1 | 11/1994 |
|----|------------|---------|
| WO | 9803945 A1 | 1/1998 |
| WO | 9902449 A1 | 1/1999 |
| WO | 0049556 A1 | 8/2000 |
| WO | 02057178 | 7/2002 |
| WO | 2004025527 A2 | 3/2004 |
| WO | 2006136696 A1 | 12/2006 |
| WO | 2010032887 A1 | 3/2010 |

OTHER PUBLICATIONS

International Search Report and Written Opinion in related PCT Application No. PCT/US2012/034486, dated Sep. 5, 2012, pp. 1-2.

* cited by examiner

BEVERAGE DISPENSING SYSTEM WITH SOCIAL MEDIA CAPABILITIES

CROSS REFERENCE TO RELATED APPLICATIONS

This application is a continuation of and claims priority to pending U.S. Non-Provisional application Ser. No. 13/451,948, filed Apr. 20, 2012 and to U.S. Provisional Application No. 61/478,425, filed Apr. 22, 2011, both entitled "Beverage Dispensing System with Social Media Capabilities," the entire disclosures of which are hereby incorporated by reference in their entireties and for all purposes.

FIELD OF THE INVENTION

This disclosure relates generally to a beverage dispensing system with social media capabilities, e.g., for dispensing of beverages at restaurants, theatres, and other entertainment venues.

BACKGROUND

Various beverage dispensers, such as those at restaurants, theatres and other entertainment venues, typically have either a "drop in" dispenser apparatus or a counter top type dispenser apparatus. In a drop in dispenser apparatus, the dispenser apparatus is self-contained and may be dropped into an aperture of a counter top. In a counter top type dispenser apparatus, the dispenser apparatus is placed on a counter top. In conventional beverage dispensers, a dispensing head is coupled to a particular drink syrup supply source via a single pipe dedicated to supply the particular drink syrup to that dispensing head, wherein the particular drink syrup supply source is typically located near the counter top, i.e., directly under the counter top, or directly over the counter top.

A user will typically place a cup under the signage of the selected beverage and either press a button or press the cup against a dispensing lever to activate the dispenser so that the selected beverage is delivered from the dispensing head corresponding to the selected beverage and into the cup until pressure is withdrawn from the button or lever.

Conventional dispensing systems typically do not provide social media capabilities. For example, conventional dispensing systems are not configured to receive instructions in connection with a gift a beverage from one individual to another individual. Conventional dispensing systems typically do not provide an interface that allows a recipient of a gift, coupon, or promotion, to hear and/or see an audio, text, and/or video message, such as a message of the party who sent the gift, coupon, or promotion to the recipient.

Conventional dispensing systems typically are not configured to assist users in making healthy lifestyle choices. For example, conventional dispensing systems typically are not configured to recognize that a customer is diabetic, and thus may offer the diabetic customer a product that is not appropriate for the customer's diabetic condition.

Conventional beverage dispensing systems typically are not configured to identify or recognize individuals. For example, conventional beverage dispensing systems typically are not configured with telemetry capabilities to identify a mobile device of a customer. Conventional beverage dispensing systems typically are not configured to receive from a mobile device of a customer a signal that identifies a customer and/or the beverage preference or beverage order of a customer. Thus, conventional beverage dispensing systems typically are not configured communicate with a mobile device of a customer to determine which beverage or beverages a particular individual may want to order or has ordered.

Conventional beverage dispensing systems typically are not configured to communicate with a mobile device of a customer and/or a mobile software application used by a customer. Thus, conventional beverage dispensing systems typically are not configured to determine whether a particular customer has ordered and/or has paid for a particular beverage and/or has redeemed a coupon, promotion, etc., that entitles the customer to receive the beverage. Conventional dispensing systems typically do not enable Alternative Reality Gaming (ARG) promotions and/or campaigns. Conventional dispensing systems typically do not enable detection of code(s), check-in(s), and/or other awareness of certain electronic device(s) of a user, e.g., a mobile communication device(s), and typically do not enable communication with such an electronic device(s). Conventional dispensing systems typically do not provide a system that can be used to create a partnership, including a campaign, with philanthropic organizations and/or activities.

Conventional beverage dispensing systems typically are not configured to automatically provide a beverage promotion or discount to a customer upon identification of the customer.

Conventional beverage dispensing systems typically are not configured to monitor ordering, filling and refilling activities of a particular customer.

Conventional beverage dispensing systems typically are not configured to receive and process orders from mobile devices of customers, and thus are not configured to reduce or eliminate wait time by customers to receive ordered beverages.

Conventional dispensing systems typically are not configured to automatically change their beverage offerings based on time of day and/or event at a venue.

What is needed is a beverage dispensing system that does not have the limitations and disadvantages of conventional dispensing systems and methods.

SUMMARY

Accordingly, there may be provided a processing or dispensing system with social media capabilities.

In an aspect of the disclosure, a method is provided comprising receiving instructions at a first device. The instructions may correspond to an item transaction. The item may be a food product. The item transaction may comprise an item gift. The method may comprise generating a code based on the instructions received at the first device for the item transaction. The method may comprise generating a message at the first device. The method may comprise transmitting the code and the message from the first device to a second device.

The above and other aspects, features and advantages of the present disclosure will be apparent from the following detailed description of the illustrated embodiments thereof which are to be read in connection with the accompanying drawings.

DETAILED DESCRIPTION

Figure 1:
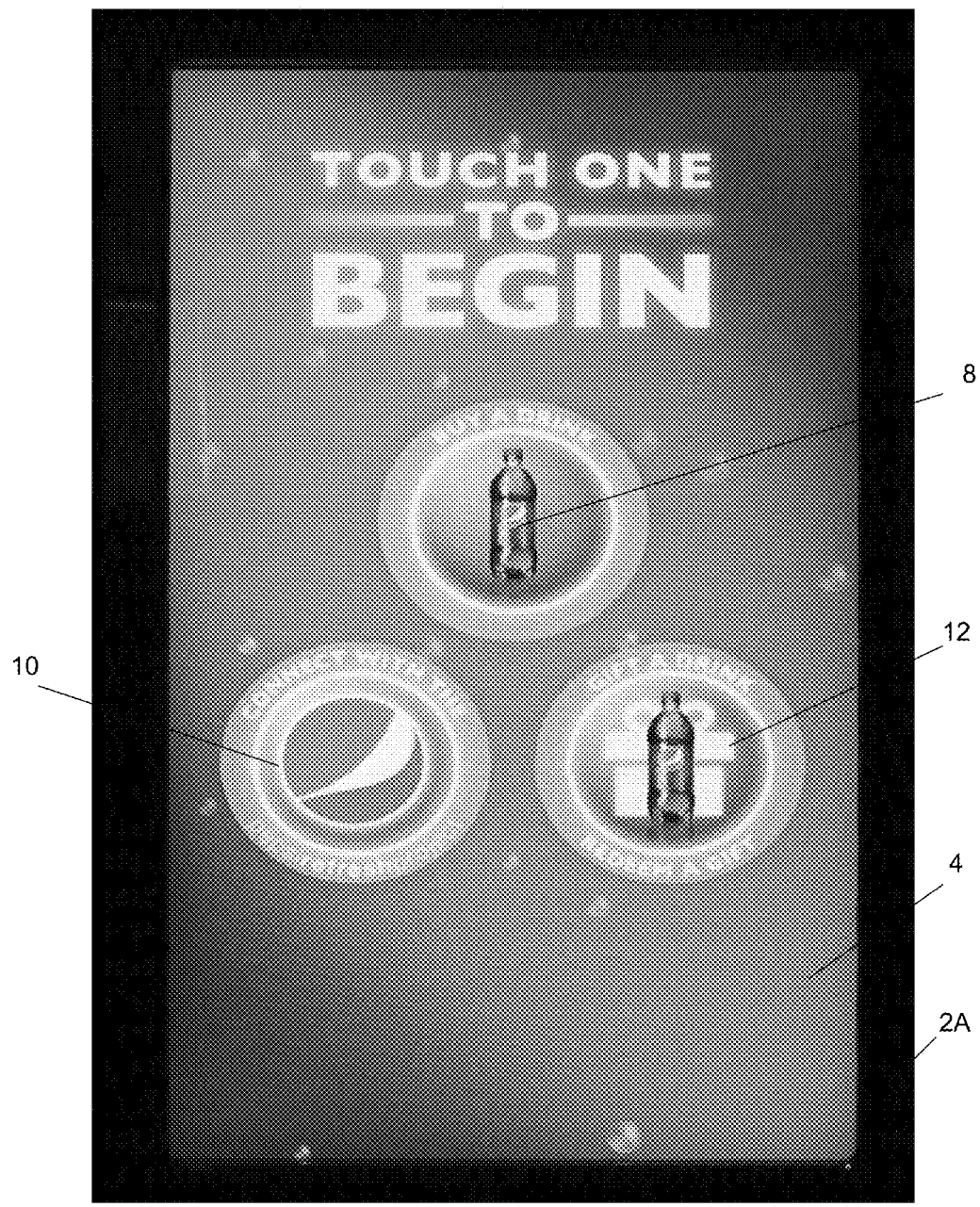
FIG. 1 shows a user interface, including a screen display, which may be used to implement various aspects of the disclosure.

The embodiments discussed below may be used to order, deliver and form a wide variety of food products, including but not limited to free-flowing food products, including cold and hot beverages, and including but not limited to beverages known under any PepsiCo branded name, such as Pepsi-Cola®.

In an aspect of the disclosure, a method is provided comprising receiving instructions at a first device. The instructions correspond to an item transaction. The item is a food product. The item transaction comprises an item gift. The method comprises generating a code based on the instructions received at the first device for the item transaction. The method comprises generating a message at the first device. The method comprises transmitting the code and the message from the first device to a second device.

In an aspect, a method may be provided comprising receiving at a device a code. The code may correspond to instructions for an item transaction. The item may be a food product. The item may be an item gift. Based on the received code, the method may comprise displaying a message and delivering the item gift.

In an aspect, a method may be provided comprising the receiving a user preference at a social media computer. The method may comprise automatically generating a message and an associated code based on the user preference. The method may comprise automatically transmitting the message and the associated code to the user. The message and associated code may correspond to an item promotion.

In an aspect, a device may be provided comprising a transmitter. The device may comprise a receiver. The receiver may be configured to receive instructions corresponding to an item transaction. The item may be a food product, and the item transaction may be an item gift. The device may comprise a memory. The device may comprise a processor. The processor may be coupled to the memory for executing instructions. The instructions may comprise generating a code based on the instructions received at the first device for the item transaction. The instructions may comprise generating a message at the device. The instructions may comprise transmitting the code and the message from the device to another device.

In an aspect, a method is provided comprising receiving instructions at a device. The instructions correspond to an item transaction. The item is a food product. The item transaction is selected from the group consisting of an item purchase order, an item gift, an item redemption, and an item promotion. The method comprises generating a code based on the instructions received at the device for the item transaction. The method comprises transmitting the code to a communications network. The method comprises receiving a message at the device. The message is selected from the group consisting of a text message, an audio message, a graphic message, and a video message. The method comprises transmitting the message to the communications network.

In an aspect of the disclosure, there may be provided a system with social media capabilities comprising at least one dispensing component, for example, a beverage dispensing head.

In one aspect, a processing or dispensing system with social media capabilities is provided. The processing or dispensing system may be used for the dispensing of beverages at any suitable venue, including restaurants, theatres, and other entertainment venues.

In one aspect, a processing or dispensing system may be provided comprising a social media computer or server, and an interface. The social media computer may be configured to be operatively connected to the interface and receive from the interface instructions for a beverage purchase order, a beverage gift, a beverage redemption, or a beverage promotion, and generating a code based on the received instructions.

In one aspect, a processing or dispensing system may be provided comprising at least one social media computer or server that may be configured to be operatively coupled to a communications network. The social media computer may be configured to generate instructions for transmitting and display of a message, the message selected from the group consisting of an offer, a gift, a promotion, and a discount associated with a beverage.

In one aspect, a processing or dispensing system may be provided comprising at least one social media computer or server that may be configured to be operatively coupled to a communications network. The social media computer may be configured to receive a customer order from a mobile device of the customer through the communications network. The social media computer may be operatively coupled to a controller. The social media computer may be configured to generate instructions in response to the customer order. The controller may be configured to receive instructions from the social media computer and to provide an appropriate beverage or amount of beverage ingredients to a dispenser, such as a dispenser having a dispensing head in response to the instructions.

FIG. 1 shows a communication device or machine 2A, including a screen display 4, which may be used to implement various aspects of the disclosure. Display 4 may comprise a glass surface. Display 4 may have a surface having a curvature to provide a premium appearance by adding fullness to a main surface of display 4. For example, display 4 may comprise a surface having a slightly convex surface. Thus, a slight curvature may be achieved by adding or otherwise providing slight convex surfacing to a main surface of display 4.

Communication device 2A may be a user interface device. Screen display 4 may be any suitable display, such as a touch screen display or a gesture recognition display. Communication device 2A may be configured to recognize a communication device 130 or 132 of a user or consumer when such a device of the user or consumer is in close proximity to communication device 2A. As shown in FIG. 1, screen display 4 may provide a plurality of options. As shown, screen display 4 may provide a purchase order option 8 (e.g., "buy a drink" option). Screen display 4 may provide an option 10 for connecting with a web site 10 (e.g., a web site of PepsiCo). Screen display 4 may provide an option 12 for either gifting a gift or redeeming a gift (e.g., "gift a drink" or "redeem a gift").

Figure 2:
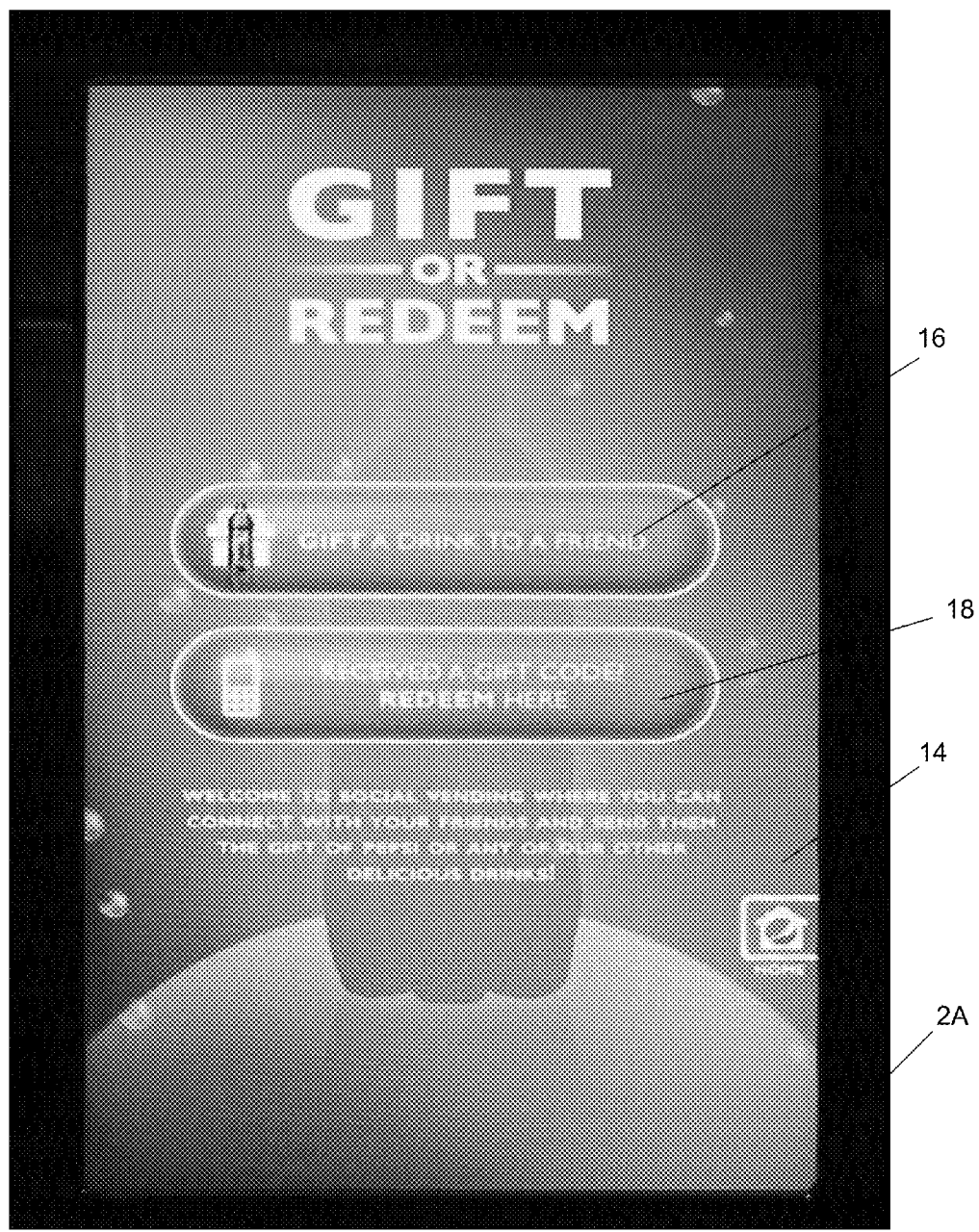
FIG. 2 shows a user interface, including a screen display, which may be used to implement various aspects of the disclosure.

FIG. 2 shows a communication device 2A, including a screen display 14, which may be used to implement various aspects of the disclosure. Screen display 14 may be the screen that is displayed after a user chooses option 12 in FIG. 1. Screen display 14 may provide an option 16 to gift a gift to another person, e.g., a friend, a family member, a colleague, etc., along with a message, such as a text, audio, graphic and/or video message. Screen display 14 may provide an option 18 to redeem a gift code.

Figure 3:
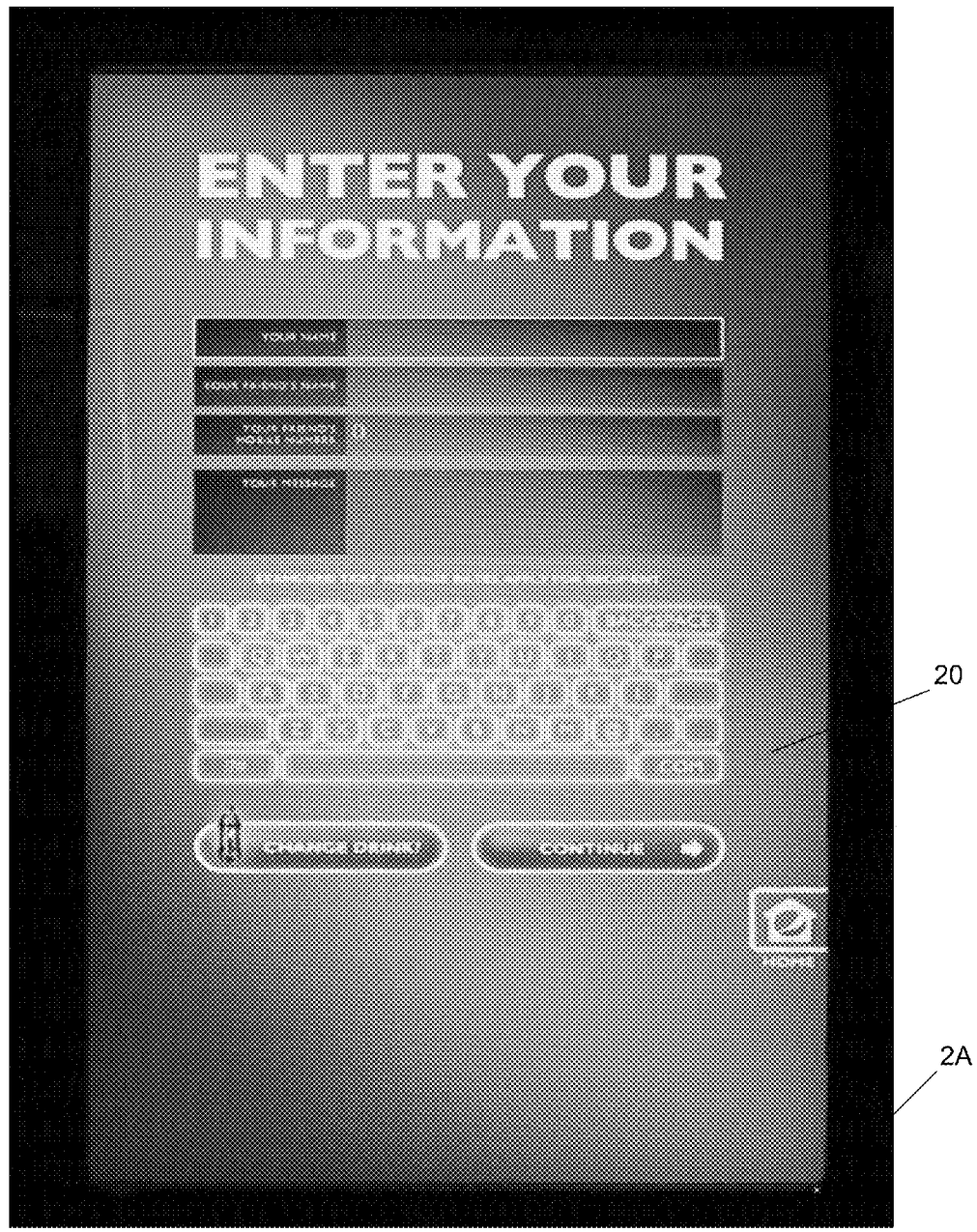
FIG. 3 shows a user interface, including a screen display, which may be used to implement various aspects of the disclosure.

FIG. 3 shows a communication device 2A, including a screen display 20, which may be used to implement various aspects of the disclosure. Screen display 20 may be the screen that is displayed after a user chooses option 16 in FIG. 2. Screen display 20 may provide a display for a user to enter information about themselves (e.g., their name), their friend's name, their friend's mobile number, and their message to their friend. Screen display 20 may provide a display of a beverage to be gifted to the friend, and a user can change the drink by selecting the "change drink" button. Screen display 20 may provide a "continue" button when the user is finished entering information and drink selection.

Figure 4:
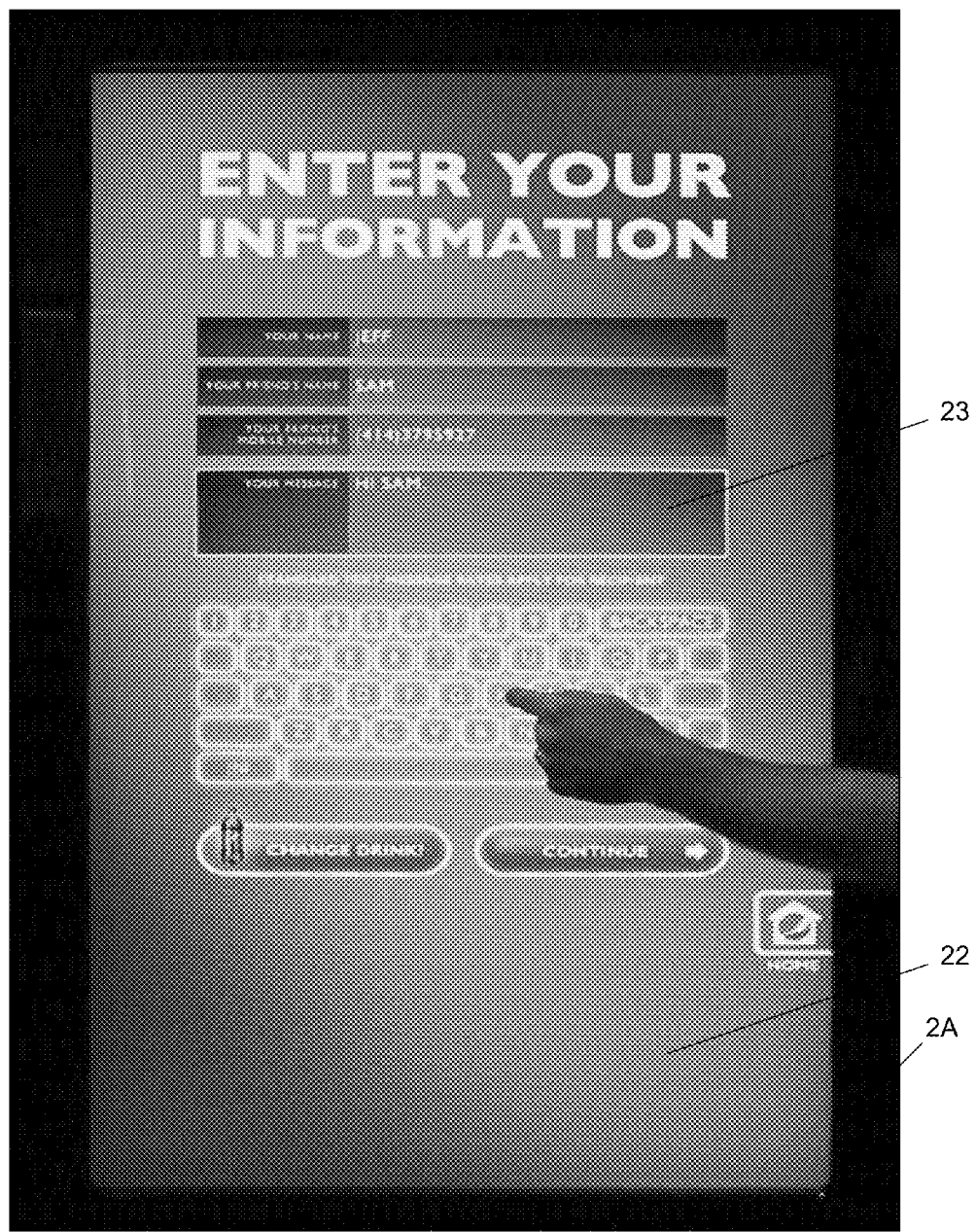
FIG. 4 shows a user interface, including a screen display, which may be used to implement various aspects of the disclosure.

FIG. 4 shows a communication device 2A, including a screen display 22, which may be used to implement various aspects of the disclosure. Screen display 22 may be similar to the screen display 20 in FIG. 3, the addition that a user has now entered information about themselves (e.g., their name), their friend's name, their friend's mobile number, and their message to their friend. Screen display 22 may provide a display of a beverage to be gifted to the friend, and a user can change the drink by selecting the "change drink" button. Screen display 22 may provide a "continue" button when the user is finished entering information and drink selection.

Figure 5:
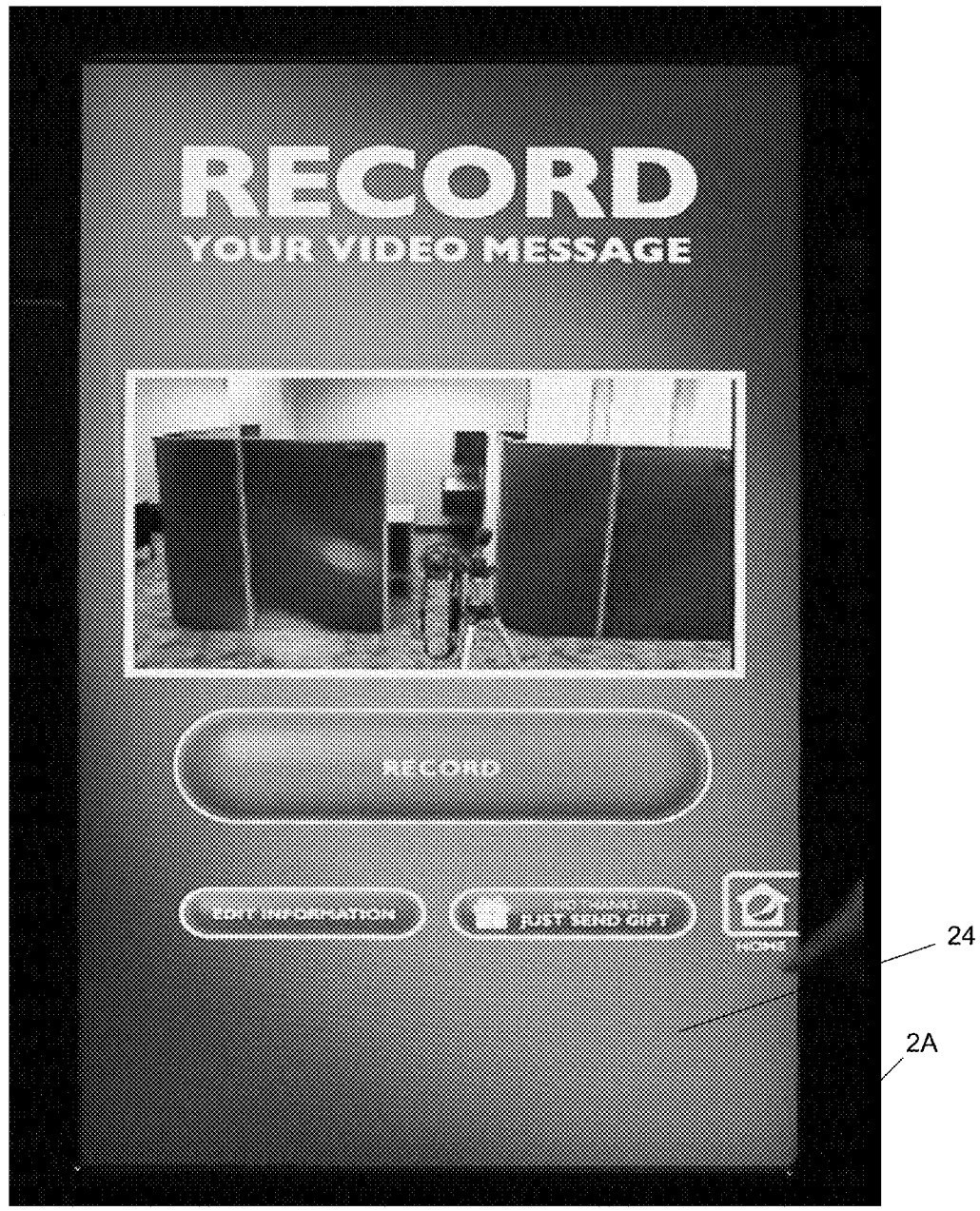
FIG. 5 shows a user interface, including a screen display, which may be used to implement various aspects of the disclosure.

FIG. 5 shows a communication device 2A, including a screen display 24, which may be used to implement various aspects of the disclosure. Screen display 24 may be the screen that is displayed after a user selects the "continue" button in screen display 22 shown in FIG. 4. Screen display 24 may provide a display for a user to select the "record" button to record a video message. Screen display 24 may provide a button to edit information. Screen display 24 may provide a button for a user to send the gift without a recorded video message.

Figure 6:
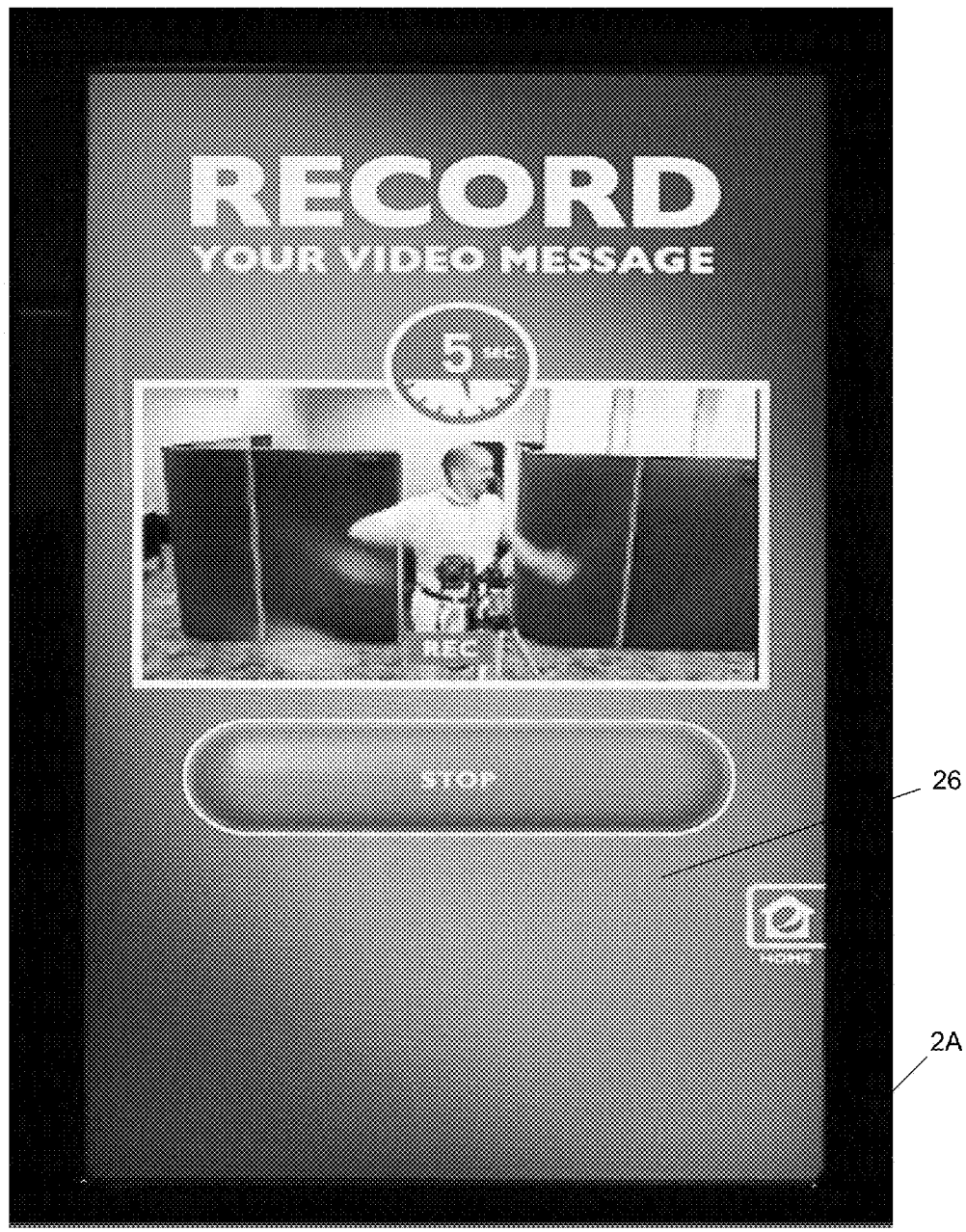
FIG. 6 shows a user interface, including a screen display, which may be used to implement various aspects of the disclosure.

FIG. 6 shows a communication device 2A, including a screen display 26, which may be used to implement various aspects of the disclosure. Screen display 26 may be the screen that is displayed after a user selects the "record" button in screen display 24 shown in FIG. 5. Screen display 26 may provide a stop button to stop the recording of a video message. Screen display 26 may provide a clock or stop watch in connection with the time corresponding to the recording time of the message.

As shown in FIGS. 2-6, a "home" button may be provided so that a user may, if desired, return home to the screen display 4 shown in FIG. 1. Any of the screen displays 4, 14, 20, 22, 24, and 26 may have a "back" button (not shown), so that a user may, if desired, go back to the prior screen display.

Figure 7:
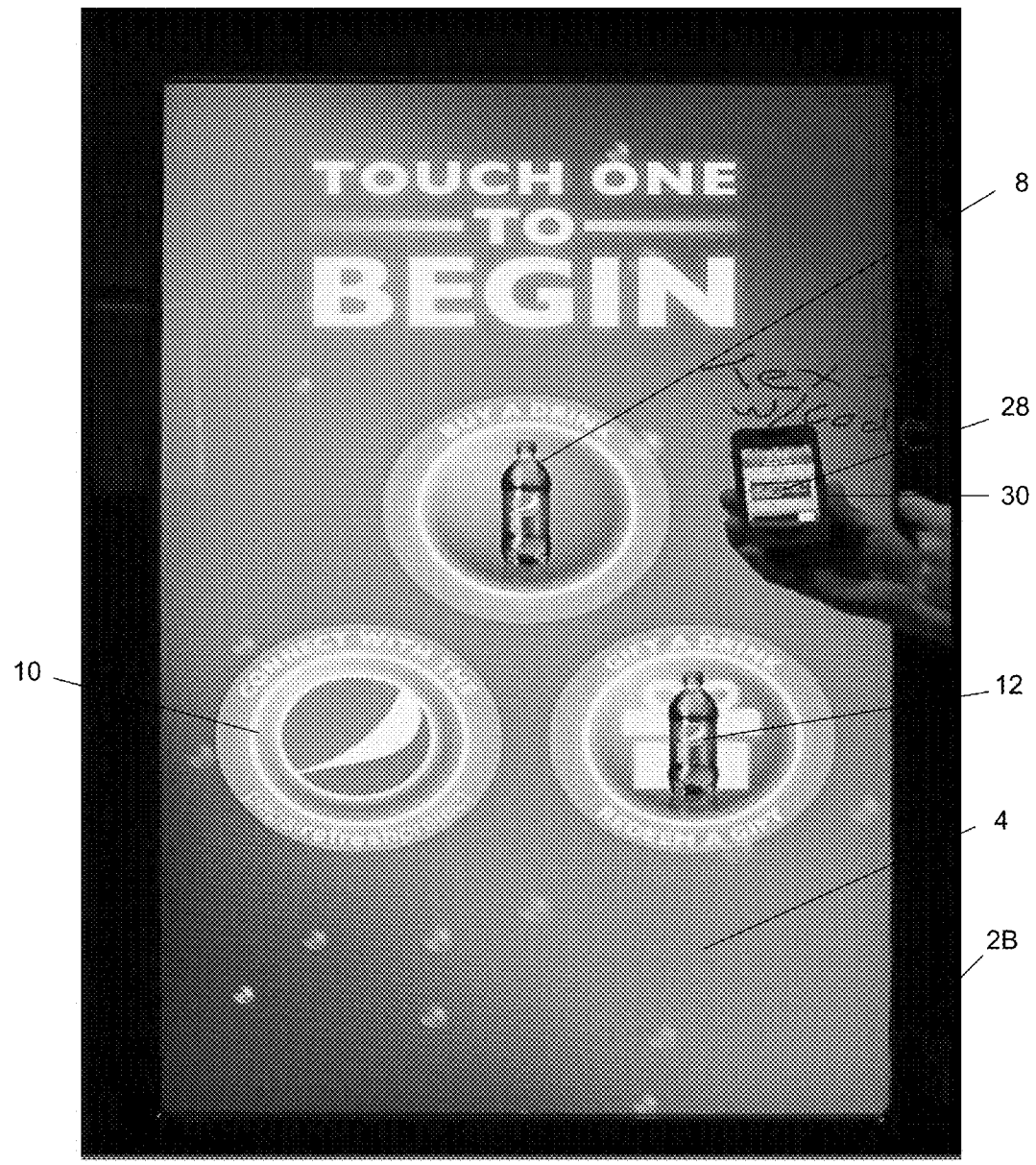
FIG. 7 shows a user interface, including a screen display, and further shows a message received by a device, which may be used to implement various aspects of the disclosure.

FIG. 7 shows a communication device or machine 2B, which may be used to implement various aspects of the disclosure. Communication device 2B may be the same as or similar to communication device 2A shown in FIG. 1. Alternatively communication device 2B may be different than communication device 2A, that is, the communication device 2B may be a separate communication or interface device, such as a communication or interface device at a different location than communication or interface device 2A. FIG. 7 shows a mobile device 28, which may be used to implement various aspects of the disclosure. Mobile device 28 may receive a message 30 in response to the information inputted by a user in screen display 22. As discussed below, a message 30, which may be the message inputted in message box 23 of screen display 22 of FIG. 4 or a variant thereof, may be transmitted from communication device 2A to a social media computer or server. Message 30 may be transmitted from the social media computer or server through a communications network to device of a recipient, such as a recipient's mobile device 28. Message 30 may advise a recipient that another person or entity has sent them gift. Message 30 may be received in any suitable form or transmission, including a text message, an e-mail, or a message on the recipient's social media page. Message 30 may provide a code that entitles the recipient to receive a gift. Alternatively, message 30 may provide a link to a code that entitles the recipient to receive a gift. Upon receipt of a code that entitles the recipient to receive a gift, the recipient may select option 12 at communication device 2B, e.g., a button to "redeem a gift."

Figure 8:
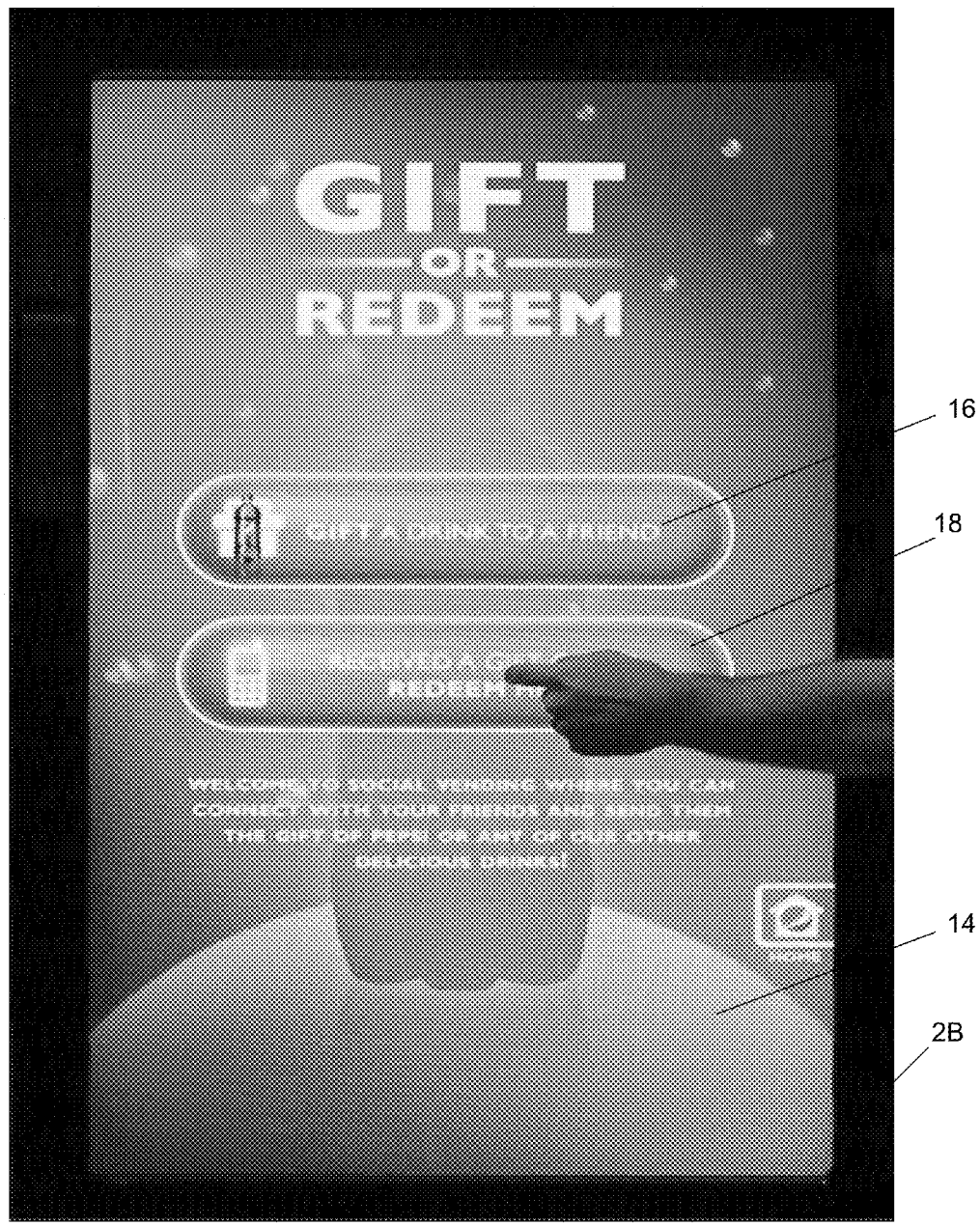
FIG. 8 shows a user interface, including a screen display, which may be used to implement various aspects of the disclosure.

FIG. 8 shows communication device 2B having screen display 14, which may be used to implement various aspects of the disclosure. Screen display 14 may be the screen that is displayed after a user chooses option 12 in FIG. 7. Screen display 14 may provide an option 18 to redeem a gift code.

Figure 9:
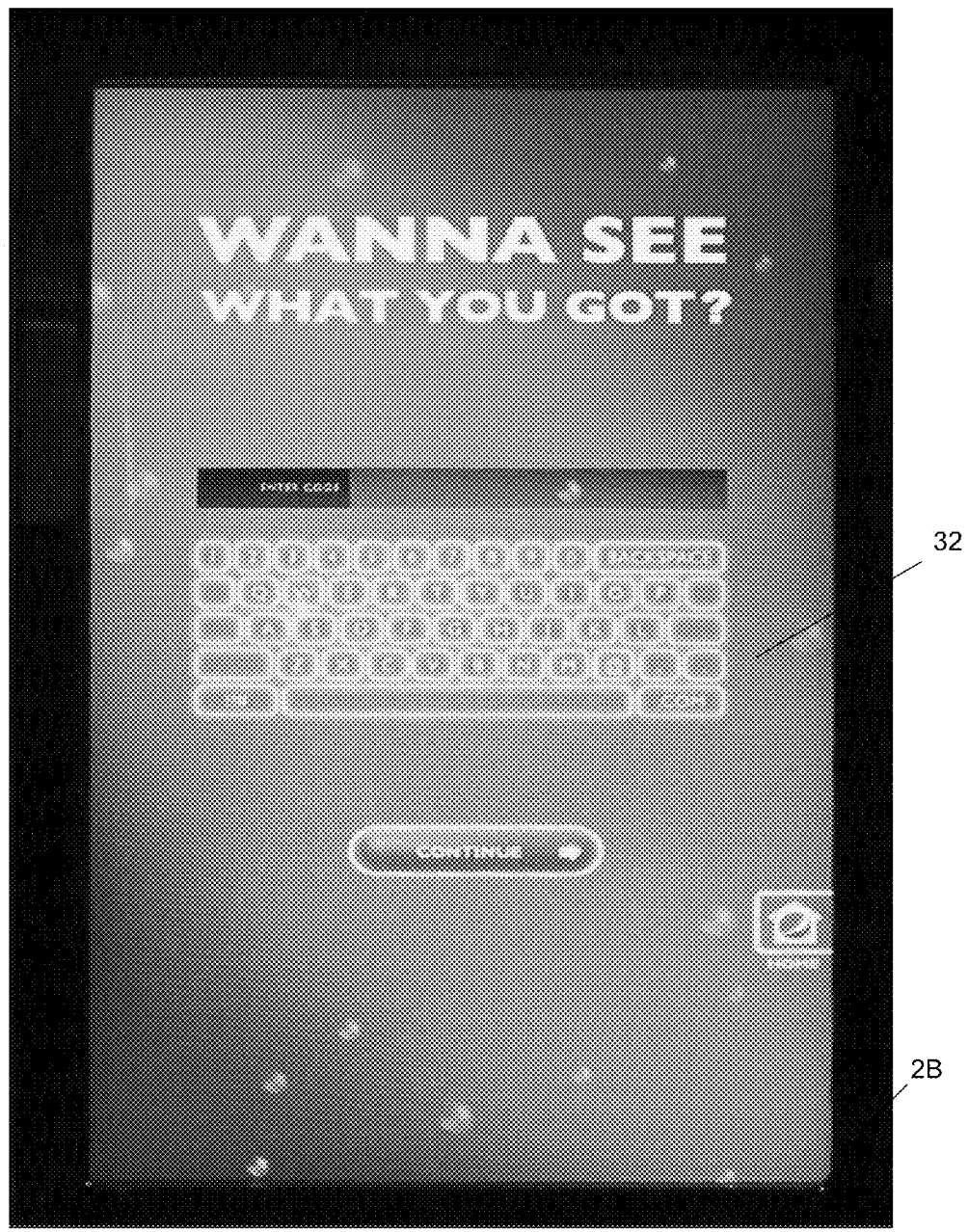
FIG. 9 shows a user interface, including a screen display, which may be used to implement various aspects of the disclosure.

FIG. 9 shows communication device 2B having screen display 32, which may be used to implement various aspects of the disclosure. Screen display 32 may be the screen that is displayed after a user chooses option 18 in FIG. 8. Screen display 32 may provide a box for a recipient to enter the gift code, and then select a "continue" button.

Figure 10:
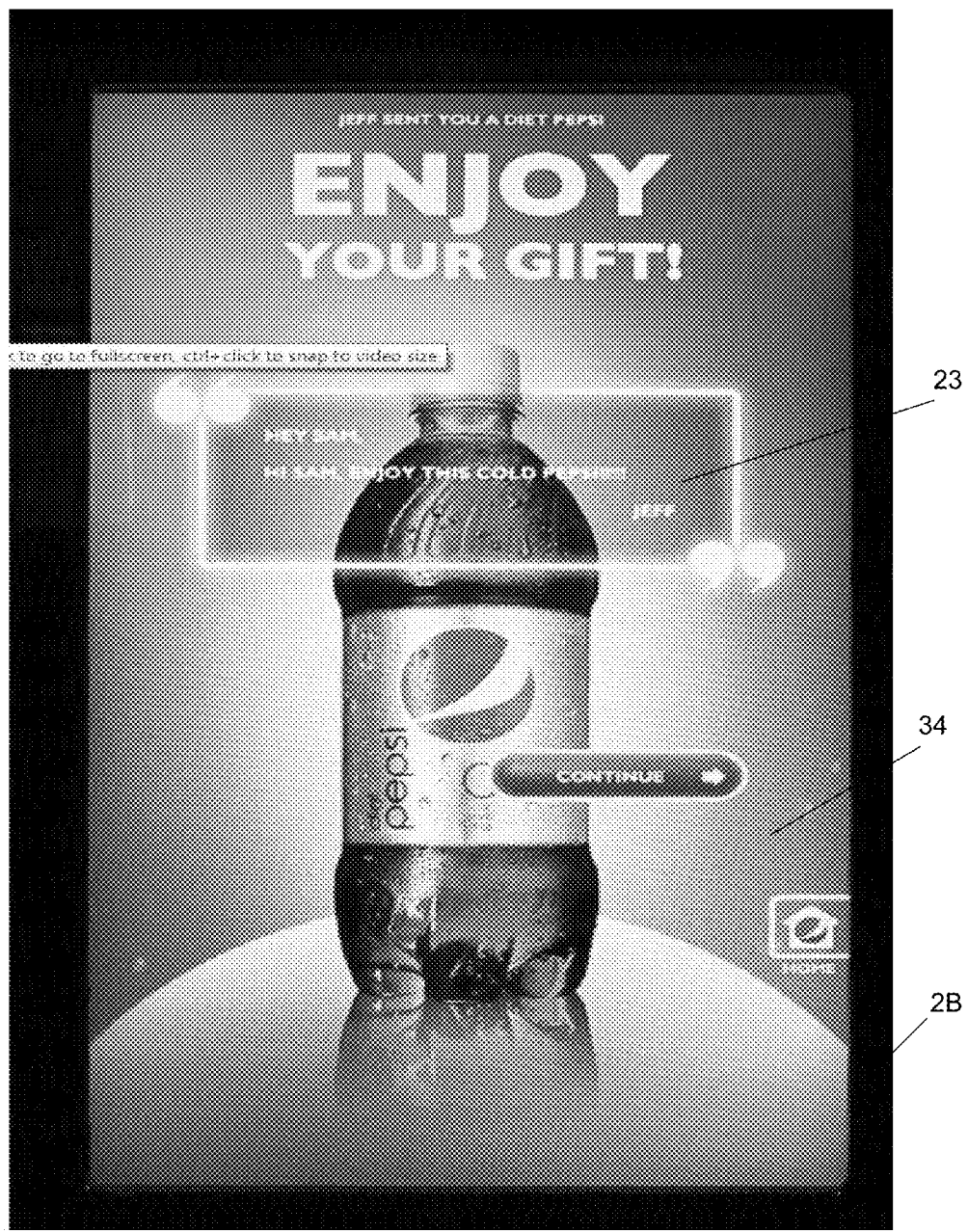
FIG. 10 shows a user interface, including a screen display, which may be used to implement various aspects of the disclosure.

FIG. 10 shows communication device 2B having a screen display 34, which may be used to implement various aspects of the disclosure. Screen display 34 may be the screen that is displayed after a recipient has entered a valid gift code and has selected the "continue" button in FIG. 9. Screen display 34 may display message 23 that was entered in screen display 22 shown in FIG. 4. The recipient may select a "continue" button as shown in FIG. 10.

Figure 11:
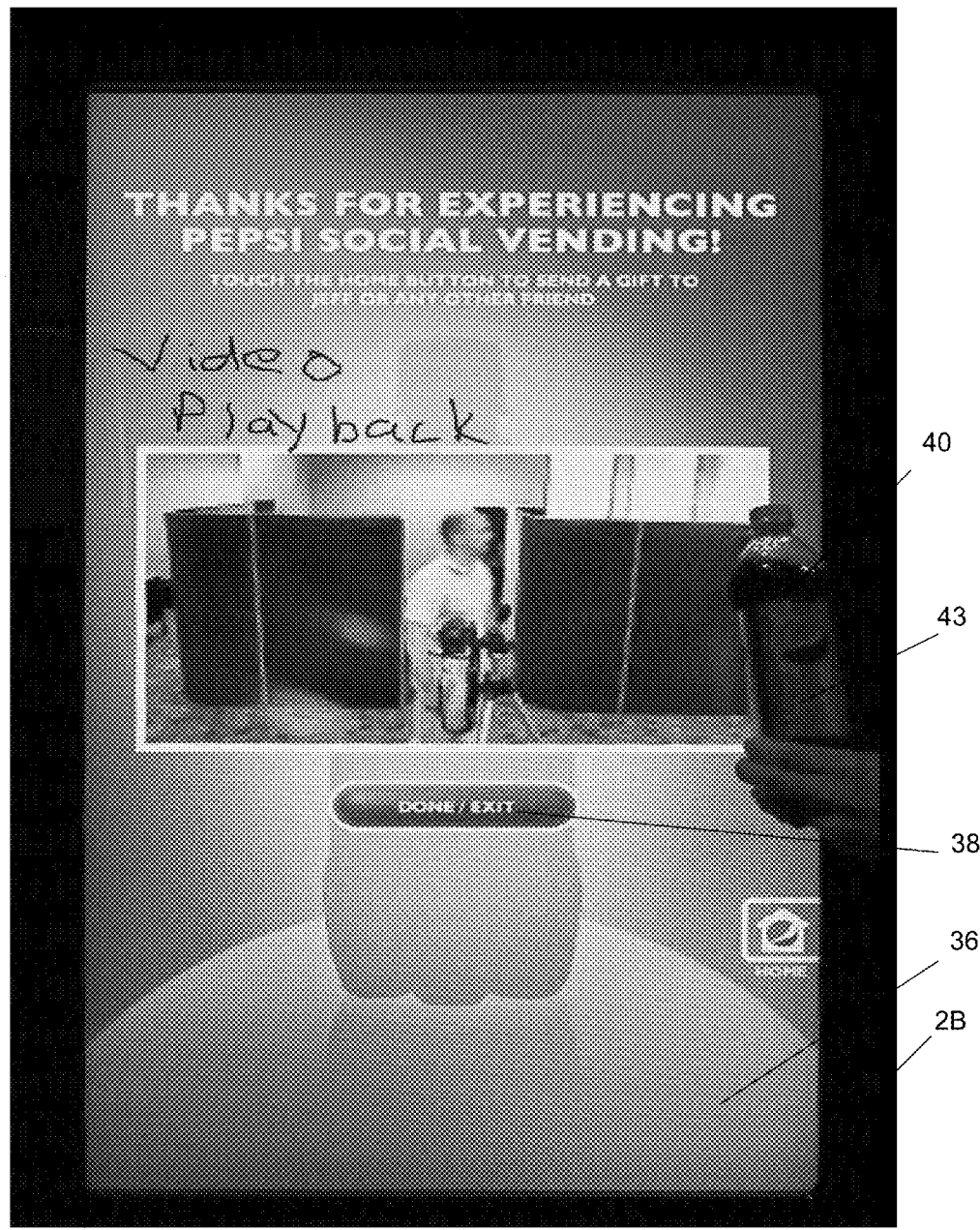
FIG. 11 shows a user interface, including a screen display, which may be used to implement various aspects of the disclosure.

FIG. 11 shows communication device 2B having a screen display 36, which may be used to implement various aspects of the disclosure. Screen display 36 may be the screen that is displayed after a recipient has selected a "continue" button of screen display 34 as shown in FIG. 10. Screen display 36 may display a video playback of the video recorded of the gift giver (see screen interface 24 of FIG. 5). FIG. 11 shows a "done/exit" button that a recipient may select. FIG. 11 shows beverage 40, which has been gifted to the recipient.

Figure 12:
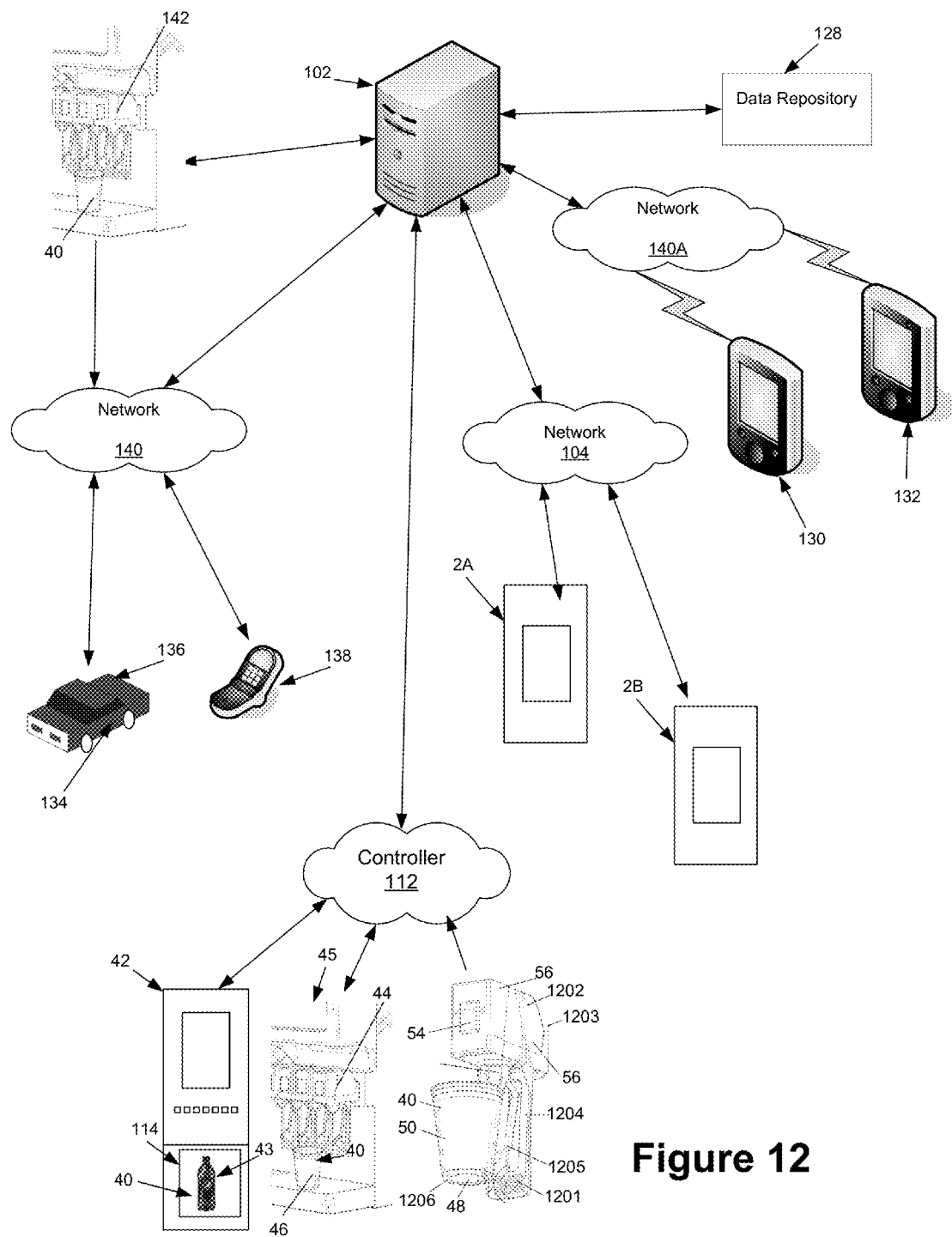
FIG. 12 shows a diagram of a system that may be used to implement various aspects of the disclosure.

Beverage 40 may be dispensed by a dispenser, e.g., a dispenser 114 of a vending machine dispenser 42 shown in FIG. 12. Beverage 40 may be placed in a suitable container 43, such as a bottle, can, or pouch. Alternatively, beverage 40 may dispensed through a dispensing head 44 of dispenser 45 into a cup 46 as shown in FIG. 12.

FIG. 12 shows a diagram of a processing or dispensing system that may be used to implement various aspects of the disclosure. A processing or dispensing system comprises a social media computer or server 102. Server 102 may be configured to be operatively coupled to a communications network 104. The social media computer 102 may be configured to receive customer orders from communication devices 2A and 2B through the communications network 104.

A readable code 48 associated with a particular beverage and volume, such as a readable bar code, ultraviolet ink code or a RFID code, may be placed on a cup 50, such as the bottom 1206 of cup 50. Cup 50 may be provided to a user, including but not limited to a customer or recipient, and the user may then place the cup in manner for the code to be read by a detector or reader 1201, and an appropriate amount of beverage ingredients may be dispensed through a dispensing head 54 of dispenser 56 into cup 50. For example, see U.S. Ser. No. 12/704,217, filed Feb. 11, 2010, published on Aug. 12, 2010 as U.S Patent Application Publication No. 2010/0200110, which is incorporated herein by reference in its entirety. As shown FIG. 12, components 1202, 1203, 1204, and 1205 are various other components of dispenser 56.

The social media computer 102 may be operatively coupled to a controller 112. The social media computer 102 may be configured to generate instructions in response to the customer orders made at communication devices 2A and 2B. The controller 112 may be configured to receive instructions from the social media computer 102, and to control the dispensing of a beverage 40 from a dispenser 42, such as a vending machine dispenser 114. Alternatively, beverage 40 may dispensed through a dispensing head 44 of dispenser 45 into a cup 46 as shown in FIG. 12. Controller 112 may be a central controller and/or may be a separate controller that is incorporated into each dispenser, such as dispensers 42, 45, 56, and/or 142.

An interface or software application may be provided at devices 130 and 132, such as mobile devices. Social media computer 102 may be operatively connected to devices 130 and 132 through a communications network 140A. A user of device 130 may access an interface using device 130, such as an interface of communication device 2A as previously described, to gift a beverage. A user of device 132 may access an interface using device 132, such as an interface of communication device 2B as previously described, to receive information regarding a gift, as well as a message 30, and video playback of a recorded message from the giver of the gift, as previously described. Devices 130 and 132 may be mobile devices.

Information received by social media computer 102 made be stored in a data repository 128.

Social media computer 102 may be configured to generate instructions in response to the customer orders in connection with a beverage order placed by a customer using a communication device, such as a mobile device 134 while the customer is in a vehicle 136, or using a mobile device 138 when the customer is on foot at a location, which may be a location remote from a dispenser, e.g., a city block away from a dispenser. Social media computer 102 may be operatively coupled to communication devices 134 and 138 through network 140 or network 104.

Server 102 may be configured to be operatively coupled to a dispenser 142 at drive through or pickup window (not shown). Dispenser 142 may be the same as or similar to dispensers 42, 45, and 56, as previously described.

In one aspect of the disclosure, the interfaces and/or devices may be networked together through communications network 112, 140, or 140A. Communications network 112 may represent: 1) a local area network (LAN); 2) a simple point-to-point network (such as direct modem-to-modem connection); and/or 3) a wide area network (WAN), including the Internet and other commercial based network services. In one aspect, the interfaces and/or devices may be connected to social media computer 102 through communications network 104 or 140 using various well-known protocols, such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, fourth-generation (4G) cellular data communications, Global System for Mobile communications (GSM), or other wireless communication networks or the like may be used as the communications protocol. The interfaces and/or devices may be physically connected to each other or one or more networks via twisted pair wires, coaxial cable, fiber optics, radio waves or other media. In an aspect, known standard protocols may be used, including Flash, HTML5, etc.

The term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks. A "network," as used herein, may also include a network of "virtual" servers, processes, threads, or other ongoing computational processes which communicate with each other, some or all of which may be hosted on a single machine which may provide information to client servers, processes, threads or other ongoing computational processes on that same machine, other machines, or both.

As further illustrated in FIG. 12, a data repository 128 may be coupled to social media computer 102 for storage or retrieval of data, which may be used to implement various aspects of the disclosure. Such data may include customer identification information used to track customer purchases and activities. Such tracking may be performed upon approval of the customer. For example, information that may be stored by or retrieved from data repository 128 may track a code on a cup to track which beverage selection(s) are made through the use of the cup. The data repository 128 may physically be located in the social media computer or server 102, or in a separate machine in the same or separate location.

Figure 13:
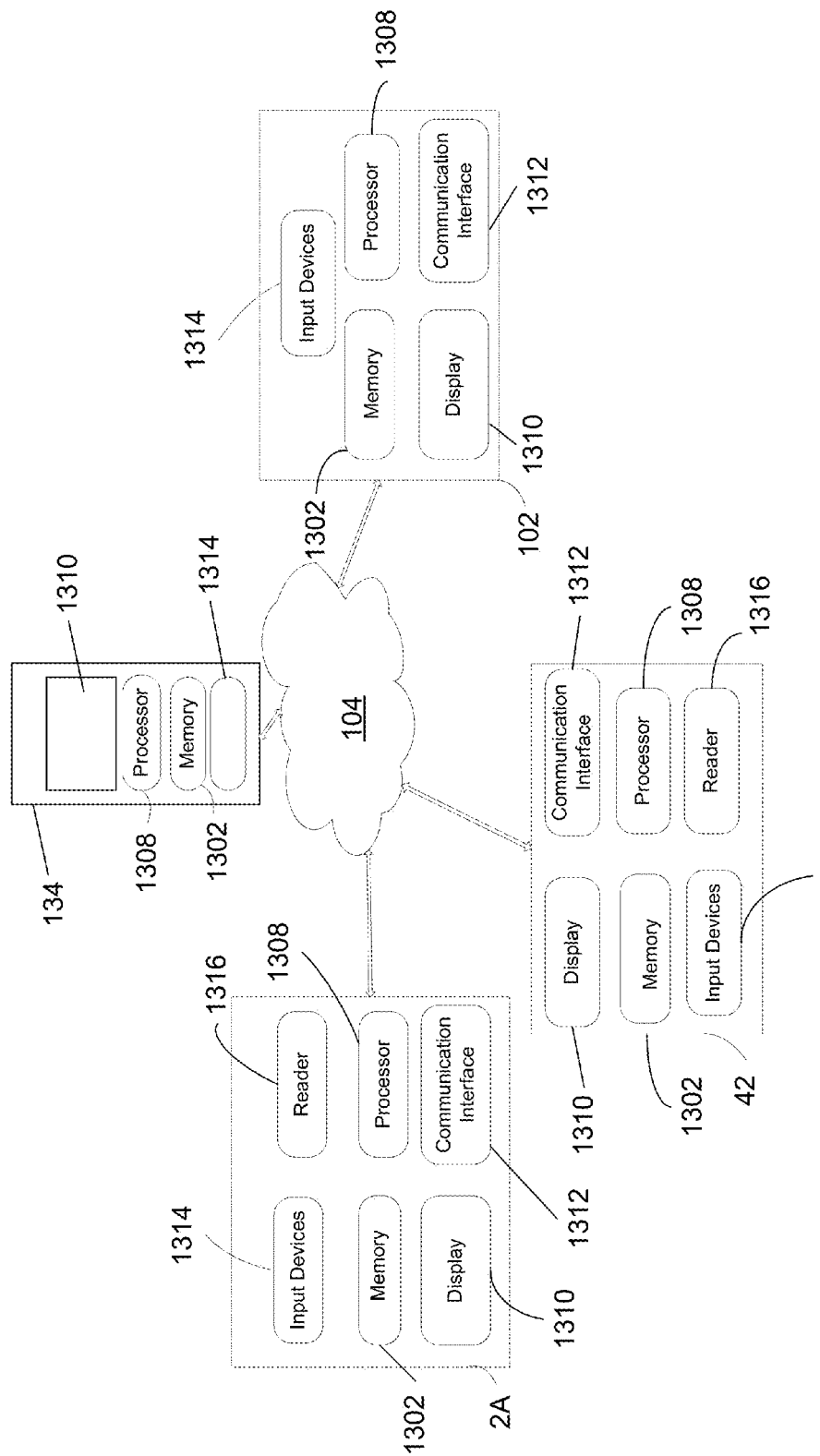
FIG. 13 shows a simplified diagram of a system in accordance with various aspects of the disclosure.

The devices and machines described above may be operatively connected to each other through a communications network, such as communications network 104 and/or 140. FIG. 13 shows a simplified diagram of a processing or dispensing system in accordance with various aspects of the disclosure. Social media computer 102, communication devices 2A and 2B, mobile devices 134 and 138, and dispensers 42, 45, 56, and 142 may comprise non-transitory memories, processors, displays (which may include touchscreens), and communication interfaces. By way of example, as shown in FIG. 13, communication device 2A, social media computer 102, dispenser 42, and mobile device 134 may each comprise a non-transitory memory 1302, a processor 1308, a display 1310, and a communication interface 1312. The processors 1308 may execute computer-executable instructions present in non-transitory memories 1302 such that, for example, the communication device 2A, dispenser 42, and mobile device 134 may each send and receive information to and from social media computer 102 via network 104.

Processor 102 shown in FIG. 12 may be a processor 1308 as shown in FIG. 13. Processor 1308 shown in FIG. 13 may be processor 102 shown in FIG. 12. The processing or dispensing system may further include a system bus (not shown). A system bus may be any of several types of bus structures including a memory bus or memory controller, a peripheral bus, and a local bus using any of a variety of bus architectures. The structure of system non-transitory memory is well known to those skilled in the art and may include a basic input/output system (BIOS) stored in a read only memory (ROM) and one or more program modules such as operating systems, application programs and program data stored in random access memory (RAM). The system may also include a variety of interface units and drives for reading and writing data.

Those of skill in the art will recognize that, in accordance with the disclosure, any suitable network connections and other ways of establishing a communications link between the computers can be used. The existence of any of various well-known protocols, such as TCP/IP, Frame Relay, Ethernet, FTP, HTTP and the like, is presumed, and central processor unit or computer may be operated in a client-server configuration to permit a user to retrieve web pages from a web-based server. Furthermore, any of various conventional web browsers may be used to display and manipulate data on web pages.

Those of skill in the art will recognize that, in accordance with the disclosure, a processing or dispensing system may include an associated computer-readable medium containing instructions for controlling the computer system may be utilized to implement the exemplary embodiments that are disclosed herein. The computer system may include at least one computer such as a microprocessor, a cluster of microprocessors, a mainframe, and networked workstations.

Social media computer 102, communication devices 2A and 2B, mobile devices 134 and 138, dispensers 42, 45, 56, and 142 may also include various input devices 1314. The input devices may include keyboards, track balls, mice, joy sticks, buttons, and bill and coin validators. Readers 1316, including but not limited to card readers, bar code readers, identification readers, credit card readers, ultraviolet ink readers, and RFID readers may be included in the system. For example, but not by way of limitation, mobile devices 134 and 138 may also include readers 1316 to enable users to identify themselves for tracking purposes. By way of example, as shown in FIG. 13, social media computer 102, communication device 2A, dispenser 42, and mobile device 134 may comprise input devices 1314. By way of example, as shown in FIG. 13, reader 1316 of communication device 2A may comprise a credit card reader.

Thus, a processing or dispensing system may be provided comprising a social media computer and an interface, the social media computer configured to be operatively connected to the interface and receive from the interface instructions for a beverage purchase order, a beverage gift, a beverage redemption, or a beverage promotion, the social media computer configured to generate a code based on the received instructions.

In one aspect, the social media computer may be configured to be operatively connected to a communications network. In one aspect, the social media computer may be configured to transmit the code through the communications network to an interface of a device, which may be a mobile device.

In one aspect, the social media computer may be configured to transmit an electronic communication to the interface of the device, the electronic communication selected from the group consisting of a text message, an audio message, a graphic message, and a video message. In an aspect, a system may be configured to receive content updates, replacement content, and/or additional content, wherein the content is selected from the group consisting of a text message, an audio message, a graphic message, and a video message.

In one aspect, the processing or dispensing system may comprise at least a first interface and second interface, and a social media computer configured to be operatively connected to the first interface and the second interface. The social media computer may be configured to receive from the first interface instructions for a beverage purchase order, a beverage gift, a beverage redemption, or a beverage promotion. The social media computer may be configured to generate a code based on the received instructions. The social media computer may be configured to transmit the code through the communications network to a device. The social media computer may be configured to receive the code inputted at the second interface and process the code.

In one aspect, the second interface may be configured to display an electronic communication. The first interface may be configured to receive a text message or a graphic message, record a video message and or record an audio message.

In one aspect, the first interface and the second interface may be selected from the group consisting of a touch screen interface, a keyboard, and a voice recognition interface, and a gesture recognition interface. In an aspect, a system may be configured to support casual touch and/or gesture based gaming.

In one aspect, the processing or dispensing system may comprise a dispenser, a reader or detector, and a social media computer. The social media computer may be operatively coupled to a communications network, the social media computer configured to receive an order from a device of a customer through the communications network. The social media computer may be configured to generate a code in response to the order. The code may be readable by a detector. The dispenser may be configured to dispense an item upon detection of the code by the detector. In one aspect, the dispenser and the detector may be integrated. In one aspect, the dispenser, the detector, and the social media computer may be integrated.

In one aspect, the detector may be selected from the group consisting of a bar code reader, an ultraviolet ink code reader, and an RFID code reader.

In one aspect, the code may be selected from the group consisting of a bar code, an ultraviolet ink code, and an RFID code.

In one aspect, the item may be a consumable item. In a preferred embodiment, the consumable item may be a food product. In one embodiment, the food product may be a beverage.

In one aspect, the beverage may be dispensed through a dispensing head. Any suitable dispensing head may be used. See e.g., U.S. Pat. No. 6,505,758, which is incorporated herein by reference in its entirety.

In one aspect, at least one controller or regulator may be configured to dose beverage ingredients to the dispensing head. In one embodiment, the controller may be configured to dose beverage ingredients to the dispensing head in accordance with instructions transmitted by the social media computer.

In one aspect, a processing or dispensing system may be provided that comprises at least one social media computer configured to be operatively coupled to a communications network. The social media computer may be configured to identify a customer preference from a mobile device of the customer through the communications network. The social media computer may be configured to automatically generate and transmit to the communications network a message addressed to the mobile device of the customer. The message may be selected from the group consisting of an offer, a promotion, and a discount associated with the customer preference. The customer preference may be a preference for a consumable item, for example a food product, including but not limited to a beverage.

In one aspect, a processing or dispensing system may be provided that comprises a social media computer and an interface. The social media computer may be configured (i) to be operatively connected to the interface. The social media computer may be configured to transmit instructions for a message display at the interface. The message display may comprise information relating to a consumable item and selected from the group consisting of a customer order, a customer preference, a redemption of a coupon, a redemption of a promotion, and a gift. The social media computer may be configured to transmit instructions to a controller for the dispensing of a consumable item. The interface may be selected from the group consisting of a touch screen interface, a keyboard, and a voice recognition interface, and a gesture recognition interface.

In one aspect, the controller may be configured to dispense an appropriate amount of at least two beverage ingredients to a dispensing head in response to the instructions from the social media computer.

In one aspect, a processing or dispensing system may be provided that recognizes an individual and makes determinations regarding what item or items to offer the individual.

In one aspect, a processing or dispensing system may be provided comprising at least one social media computer or server that may be configured to be operatively coupled to a communications network. The social media computer may be configured to identify a customer beverage preference from a mobile device of the customer through the communications network. The social media computer may be configured to generate and transmit through the communications network a communication to the mobile device of the customer. The communication may be selected from the group consisting of an offer, a promotion, and a discount associated with a beverage.

In one aspect, a processing or dispensing system may be provided comprising a social media computer or service, a touch screen interface, and a sanitizer. The social media computer may be configured to be operatively connected to the touch screen interface and receive from the touch screen interface a beverage order. The social media computer may be configured to generate and transmit instructions to the sanitizer for the sanitizing of the touch screen after the touch screen is touched by a user. The sanitizer may be any suitable sanitizer, including but not limited to a sanitizer that may provide a sanitizing puff of sanitizing agent or composition (e.g., a puff of steam), and/or sanitizing wiping motion display, and/or a sanitizing transmission of ultraviolet light to the touch screen.

In one aspect, a processing or dispensing system may be provided comprising an interface, the interface operatively connected to a social media computer or server. The interface may be configured to recognize a gesture of a user relating to a beverage order of a customer. The social media computer may be configured to receive a transmission from the interface relating to the beverage order. The social media computer may be operatively coupled to a controller. The social media computer may be configured to generate instructions in response to the customer order and transmit the instructions to the controller. The controller may be configured to receive instructions from the social media computer and to provide an appropriate amount of beverage ingredients to a dispensing head in response to the instructions.

In one aspect, the processing of dispensing system may be configured to permit the preparation of beverages with variable carbonation according to a customer order.

In one aspect, the processing or dispensing system may be configured to provide beverages with customized ingredients, including juices, flavorings, sweetness, tartness, carbonation, etc., from a single dispensing head. Thus, a dispensing system may be configured, for example, to add a sweetener or reduce or eliminate the amount of sweetener from a typical beverage formulation, e.g., add an extra sugar to a sugared tea, or reduce or eliminate sugar from a sugared tea.

In one aspect, the processing or dispensing system may be configured to provide beverages based on a gesture made at the dispensers. Thus, the dispensing system may be configured to have a gesture interface with a gesture interface reader or detector. A user may be able to gesture how much lemon or sugar to add to a beverage, and the gesture interface may provide a screen display that corresponds to the user's gesture movement. The interface may also display an icon, such as a teaspoon, to depict the amount of sugar or other ingredient to be included with, or reduced or eliminated from a beverage in accordance with the user's gesture(s) or other signals to the interface.

A visual effect may be depicted by an interface to indicate for the user the product being selected.

In one aspect, the processing or dispensing system may be configured to provide visual and/or audio feedback in response to a customer order.

In one aspect, a dispenser of the system may be configured to provide for the automatic sanitizing of a screen interface for beverage ordering.

In one aspect, the processing or dispensing system may be configured to provide a wide variety of beverages, including custom-ordered beverages, from a single dispensing head, e.g., a cola flavored with cherry, vanilla, lemon, or lime, etc., or a tea flavored with lemon, orange, peach, raspberry, etc., or a tea having one or more teaspoons of sweetener (sugar, or some other nutritive sweetener or non-nutritive sweetener).

In one aspect, the processing or dispensing system may be configured to recognize that a customer is diabetic, and thus will offer the diabetic customer only beverages which are appropriate for the customer's diabetic condition.

In one aspect, the processing or dispensing system may be configured to automatically change its offerings based on time of day and/or event at a venue.

In one aspect, the processing or dispensing system may be configured to automatically provide a beverage promotion or discount.

The processing or dispensing system may be configured to recognize the value paid for a beverage. The system may be configured to issue a cup to a user with a code corresponding to the size and the type of beverage ordered.

In one aspect, the processing or dispensing system may be configured to receive a beverage order from a mobile device of a customer to reduce or eliminate wait time by the customer to receive an ordered beverage.

In one aspect, the processing or dispensing system may be configured to provide variable pricing based on drink brands and/or cup size.

In one aspect, the processing or dispensing system may provide a hot spot for Wi-Fi or other wireless communication technology. The processing or dispensing system may be configured to provide a login page.

In one aspect, the system may provide an interactive experience through telemetry. Advantages of the system may include, but are not limited to the following.

A user may gift another person a beverage using the system.

In one aspect, the processing or dispensing system may be configured to allow users to vote on their favorite items, including but not limited to their favorite beverages.

In one aspect, the processing or dispensing system may be configured to allow an operator of the system to update digital content easily online. Thus, an operator may change messaging and media content as desired.

Operators of the system may easily, and remotely, monitor inventory levels, helping them to more efficiently plan for their business needs. In an aspect, a system may be configured to enable an operator to check an inventory level, either remotely or on location, without having to open a machine to visually inspect the inventory level. In an aspect, a system or may be configured to provide an inventory alert, e.g., provide an electronic message or other indication, such as an audible or visual alarm when an inventory level relating to product or item reaches a predetermined lower amount or limit.

Using advanced telemetry, the system may enable any user to gift another person, e.g., a friend, family member, colleague, etc., by selecting a beverage and entering the recipient's name, mobile number and a personalized message, such as a text message. There may also be an option to further personalize the gift with an audio message and/or a video message recorded right at the machine and/or a photograph taken right at the machine. The gift may be delivered with a system code and instructions to redeem it at the system or linked system. When the recipient redeems their gift, they may be given the option of either thanking the original sender with a gift of their own or paying it forward and gifting a beverage to another person, e.g., another friend, family member, colleague, etc., along with a message, such as a text, audio, graphic and/or video message.

The system may also enable a user to buy a drink for a complete stranger through any suitable social vending system in accordance with this disclosure. For example, a consumer may send a symbol of encouragement to a city that's experienced some challenging weather, or a congratulatory beverage to a university that just won a championship. The system may be configured to extend a user's digital and social programs beyond users' own devices all the way to the point of purchase.

In one aspect, the use of telemetry with the dispensing or social vending system described above, may deliver operational benefits, allowing operators to closely manage inventory levels and delivery scheduling remotely, and easily update digital content online, enabling them to change messaging and media content as needed.

In one aspect, the processing or dispensing system may comprise and/or communicate with a social media system or application. For example, when a mobile device of a consumer is within a predetermined distance from a sensor linked to the modular dispensing system, a message may be sent to the consumer's mobile device that queries the consumer whether the consumer would like to purchase a beverage. Alternatively, or at the same time, a message may appear at a counter location that queries the consumer whether the consumer would like to purchase a beverage. The social media system or application may download to the dispensing system the preference or preferences of a consumer based on the consumer's past purchases and/or identified preferences. Thus, the processing or dispensing system and/or the social media system or application may query a particular consumer when a mobile device of a consumer is within a predetermined distance from a sensor of the modular dispensing system.

The processing or dispensing system may also receive a beverage order from a consumer via a social media system or application, including but not limited to the social media system or application of a seller of beverages, including but not limited to restaurants, theaters, other entertainment venues, and manufacturers and/or distributors of beverages. A consumer may order a beverage prior to arriving at counter so that the drink may be prepared and placed in a cup by the time or close to the time the consumer arrives at the counter. Alternatively, a cup bearing a bar code, an ultraviolet ink code, or a an RFID code or identifier may be prepared and made available to the consumer for filling by the time or close to the time the consumer arrives at the counter. For example, see U.S. Ser. No. 12/704,217, filed Feb. 11, 2010, published on Aug. 12, 2010 as U.S Patent Application Publication No. 2010/0200110, which is incorporated herein by reference in its entirety. This system may save time for both consumers and beverage sellers by cutting down on wait time, ordering time, and beverage preparation time.

Thus, the system may recognize an individual and make certain decisions regarding what beverage(s) or type of beverage(s) to offer the individual. The system may change what is offered to different individuals.

In addition, the system may handle gifts or promotions given from one entity to another. By way of example, but not limitation, the system may recognize an individual, determine whether that individual has received a gift or is eligible for a promotion, and send a query to the individual as to whether the individual will accept the gift or promotion, such as a free beverage or a beverage at a reduced price. In an aspect, a system may be configured to accept a gift or promotional code for dispensing of free product or product at a reduced price.

In an aspect, a dispensing system may be configured to accept a promotional code for dispensing of an item, including but not limited to a code for dispensing of a free item or code for dispensing of an item at a reduced price. In an aspect, a system may be configured to integrate communications and/or instructions between and/or among internal groups and/or individuals of an organization and/or groups and/or individuals external to the organization, such as internal and external marketing groups and/or individuals.

In an aspect, a system may be configured to display advertising, including advertising for internal partnerships, e.g., advertising for "combo deal" of a snack product and a beverage product, wherein both the snack and the beverage are made by the same company. In an aspect, a system may be configured to display advertising, including advertising for external partnerships, e.g., advertising for "combo deal" of a snack product and a beverage product, wherein the snack and the beverage are not made by the same company. In an aspect, a system may be configured to integrate cross-system communications for cross-promotion opportunities. For example, the system may be configured to cross-promote, at a kiosk or other interface, a free flowing food product, e.g., a beverage, with video rental.

In an aspect, a system may comprise a system, wherein the system is configured to connect and/or communicate with another device, such as a companion device, including but not limited to a smartphone or tablet. The system may comprise a system that may be configured to enable a companion device, e.g., a smartphone or tablet, to communicate with the system, such as via a text entry. In an aspect, a system may be configured display local marketing messaging.

In an aspect, a system may be configured to provide messaging customizable directly by an operator or user of the system. In an aspect, a system may be configured to validate operator- or user-programmed messaging to ensure brand alignment and proper operation.

In an aspect, a system may be configured to provide real-time market intelligence and/or research on or relating to product preferences, advertising views, and purchases.

In an aspect, a system may be configured to identify and differentiate customers for targeted marketing. For example, a system may be configured to identify and differentiate customers by gender, age, sport team allegiance, location, etc., and/or past or current purchases by and/or activities of each customer. By way of further example, a system may be configured to identify a particular customer, such as when a particular customer communicates with the system via the customer's smartphone or tablet, and then send a targeted and/or personalized offer to the customer based on the customer's past or current purchases and/or activities. Such identifying may be performed upon approval of the customer.

In an aspect, a system may be configured to track how many users have viewed or communicated with each machine, the duration of each view, which screen(s) or product offerings each user viewed, whether or not each user made a purchase, which item(s), if any, was purchased by each user, and/or the length of time of each user transaction. Tracking that may involve certain identification information of a particular user may be performed upon approval of the particular user.

In an aspect, a system may be configured to generate a sales report by machine.

In an aspect, a system may be configured to communicate a machine defect, malfunction, or maintenance need to a central location.

The system may allow for a user to pull into a drive up location and through the user's mobile device (e.g., a personal digital assistant, cell phone, or smart phone), via telephone or Wi-Fi, Bluetooth or other suitable communication system, know where the user is located and shows the user a menu, and may also provide the user with a special drive up line to pick up an order.

The system may allow for geolocation for advertising due to restricted street sign usage.

The system may allow for custom made beverages, including but not limited to variable sweetness, juice, flavoring(s), and/or carbonation. For example, the system may query a user as to whether the user would like to order a beverage with a user specified level sweetness, juice, flavoring(s), and/or carbonation. The user may order a beverage having a user specified level of sweetness, juice, flavoring(s), and/or carbonation, for example, from communication devices 2A or 2B, and that user specified level of sweetness, juice, flavoring(s), and/or carbonation may be sent through communications network 104 to social media computer 102. Social media computer 102 may send instructions to controller 112 for an appropriate dosing so that a beverage is dispensed from a dispenser operatively connected to controller 112, such as dispensers 45, 56, and 142, in accordance with the user's specified sweetness, juice, flavoring(s), and/or carbonation.

Controller 112 may control a dispensing system, including but not limited to a modular dispensing system disclosed in U.S. Ser. No. 13/116,247 (filed May 26, 2011) and/or a multi-tower modular dispensing system disclosed in U.S. Ser. No. 13/116,266 (filed May 26, 2011), the disclosures of each of which are incorporated herein by reference in their entireties. As noted in these applications, those of skill in the art will recognize that control of delivery may be achieved through use of an intelligent device, such a computer or purpose embedded electronics.

In an embodiment, a user or customer may login at a website, e.g., via manual login, auto login, near field communication (NFC) login or recognition login). The login may be for an account of the user or customer. In an aspect, a system may be provided, the system configured to accept a payment or redemption from a payment or redemption system, such as a smart or virtual wallet for in-store and/or online shopping. The system may be configured to communicate with a smart or virtual wallet, in connection with an item transaction. The system may be configured to accept payment or redemption by a credit card, a debit card, a top-up card, and/or a loyalty and/or reward card and/or an account of a user, including such cards or accounts of or in a smart or virtual wallet. The system may be configured to integrate with a rewards system. For example, the system may be configured to credit a loyalty and/or reward card or account of a user. The system may be configured to receive suggestions from a user regarding products to stock or provide at a location or dispensing machine. The system may be configured to receive such suggestions from multiple users and weigh or assign a weighting to the suggestions. Such weighing or weighting may be based, at least in part, according to past purchases of product, and/or trends of past purchases of product.

The user or customer can order a beverage for themselves or another, including but not limited to a custom beverage according to inputs of the user or customer, and purchase the beverage. The user or customer may "build" or "construct"

a beverage using a user interface device or machine 2A and/or through a website connected with a network, including but not limited to network 104, network 140, or network 104A. By way of example, but not limitation, a user or customer may build or construct a beverage using a smartphone and/or at an interface at a kiosk or table, and instructions are sent to controller 112, which may control a dispensing system, including but not limited to a modular dispensing system disclosed in U.S. Ser. No. 13/116,247 (filed May 26, 2011) and/or a multi-tower modular dispensing system disclosed in U.S. Ser. No. 13/116,266 (filed May 26, 2011) so that the ordered beverage is delivered to or made available at a dispenser, e.g., dispensers 42, 45, 56 and 142. A user or customer may go to the dispenser, such as at a banner area, and activate or pull down on an activation device to dispense the ordered beverage into a cup. In an embodiment, a code may be placed on a cup, and the dispenser may dispense an ordered beverage into a cup upon the detection of the code. The code may correspond to a particular user or customer, and/or correspond to a particular ordered beverage.

In one aspect, a user or customer may set or select a color for drink. Thus, for example, controller 112 may control the color of a beverage in accordance with a user or customer color order. The final drink color may thus be modified to be more appealing to the user or customer, such as setting the color for certain events, teams or occasions.

In one aspect, an individual may have a "preferred" beverage(s) posted on a website, such as a social networking website, and that individual and/or others may select that preferred beverage(s) for delivery of the beverage at a selected dispenser location. Thus, for example, an individual who wants a preferred beverage of a celebrity may order and purchase that beverage through a website and direct that the beverage be delivered to selected dispenser, e.g., a selected dispenser at a selected restaurant, theatre or other venue.

In one aspect, a one touchscreen may be provided to drive multiple nozzles for the pouring of beverages.

In one aspect, a smartphone application may be provided to find or locate specific equipment, e.g., a smartphone application to find or locate a particular kiosk, computer interface, and/or dispenser(s), such as an application for locating the nearest dispenser or equipment. In an aspect, an interface and/or dispenser may be configured to have a low profile, and thus allow for sight lines in specific channels, e.g., shopping malls.

In one aspect, the dispenser may provide a WiFi hotspot. In an aspect, an apparatus or dispenser may be configured to provide access to an alternate current ("AC") power for recharging of devices, e.g., smartphones and tablets.

In an aspect, a system may be configured to allow a user interface ("UI") to be updated remotely, e.g., a live update for software or hardware.

In one aspect, a dispensing system may be provided comprising an interface, the interface operatively connected to a social media computer or server. The interface may be configured to recognize a gesture of a user, i.e., track three-dimensional (3D) head or body motions, in real-time relating to a beverage order of a customer. The social media computer may be configured to receive a transmission from the interface relating to the beverage order. The social media computer may be operatively coupled to a controller. The social media computer may be configured to generate instructions in response to the customer order and transmit the instructions to the controller. The controller may be configured to receive instructions from the social media computer and to provide an appropriate amount of beverage ingredients to a dispensing head in response to the instructions.

In accordance with aspects of the disclosure, a dispensing system may be provided that has social media capabilities. For example, a dispensing system may be provided that is configured to receive instructions in connection with a gift a beverage from one individual to another individual. The dispensing system may provide an interface that allows a recipient of a gift, coupon, or promotion, to hear and/or see an audio, text, graphic, and/or video message, such as a message of the party who sent the gift, coupon, or promotion to the recipient.

In one aspect, a processing or dispensing system may be configured to assist users in making healthy lifestyle choices. For example, the processing or dispensing system may be configured to recognize that a customer is diabetic, and thus not offer the diabetic customer a product that is not appropriate for the customer's diabetic condition.

In an aspect, a system may be configured to communicate with and/or include a health-related computer application and/or equipment, e.g., automatic calorie tracking integration.

In an aspect, a system may be configured to comprise a user interface (UI), wherein the user interface may provide a separate option for healthy food options or choices, including beverage options or choices. Such healthy food choices may include "better-for-you" (BFY) products, and having a separate healthy option at a user interface may make selection of healthy food products easier for a user. In an aspect, a system may be configured to display nutritional information for products, including products available at a dispenser that may correspond to the user interface.

In one aspect, a processing or dispensing system may be configured to identify or recognize individuals. For example, a system may be configured to recognize when user, consumer, or customer is in close proximity to a machine. For example, a dispensing system may be configured with telemetry capabilities to identify a mobile device of a customer when the mobile device is a predetermined distance from the processing or dispensing system. A processing or dispensing system may be configured to receive from a mobile device of a customer a signal that identifies a customer and/or the beverage preference or beverage order of a customer. Thus, a processing or dispensing system may be configured communicate with a mobile device of a customer to determine which beverage or beverages a particular individual may want to order or has ordered. In an aspect, a system may be configured to receive user or consumer input of a product preference(s), including a product preference(s) that may not be typically available. In a further aspect, the system may be configured to provide information regarding the product preference to a central location, such as a non-transitory memory. In a further aspect, the system may be configured to provide build a free flowing product, e.g., a beverage, in accordance with the product preference to deliver the free flowing product to a dispenser, which may be configured to dispense the free flowing product to a container, e.g., a cup, upon activation of the dispenser by a user or the detection of a code on the cup.

In one aspect, a processing or dispensing system may be configured to communicate with a mobile device of a customer and/or a mobile software application used by a customer. Thus, a processing or dispensing system may be configured to determine whether a particular customer has ordered and/or has paid for a particular beverage and/or has redeemed a coupon, promotion, etc., that entitles the customer to receive the beverage. In an aspect, a processing or dispensing system may be configured to enable Alternative Reality Gaming (ARG) promotions and/or campaigns. In an aspect, a processing or dispensing system may be configured to enable detection of code(s), check-in(s), and/or other awareness of certain electronic device(s) of a user, e.g., a mobile communication device(s), and enable communication with such an electronic device(s). In an aspect, a processing or dispensing system may be configured to create a partnership, including a campaign, with a philanthropic organization(s) and/or activity(ies). In an aspect, a processing or dispensing system may be configured to accept change and/or direct donations to be applied to a charity or charitable organization.

In one aspect, a processing or dispensing system may be configured to automatically provide a beverage promotion or discount to a customer upon identification of the customer.

In one aspect, a processing or dispensing system may be configured to monitor ordering, filling and refilling activities of a particular customer.

In one aspect, a processing or dispensing system may be configured to receive and process orders from mobile devices of customers, and thus are not configured to reduce or eliminate wait time by customers to receive ordered beverages.

In one aspect, a processing or dispensing system may be configured to automatically change beverage offerings based on time of day and/or event at a venue.

Figure 14:
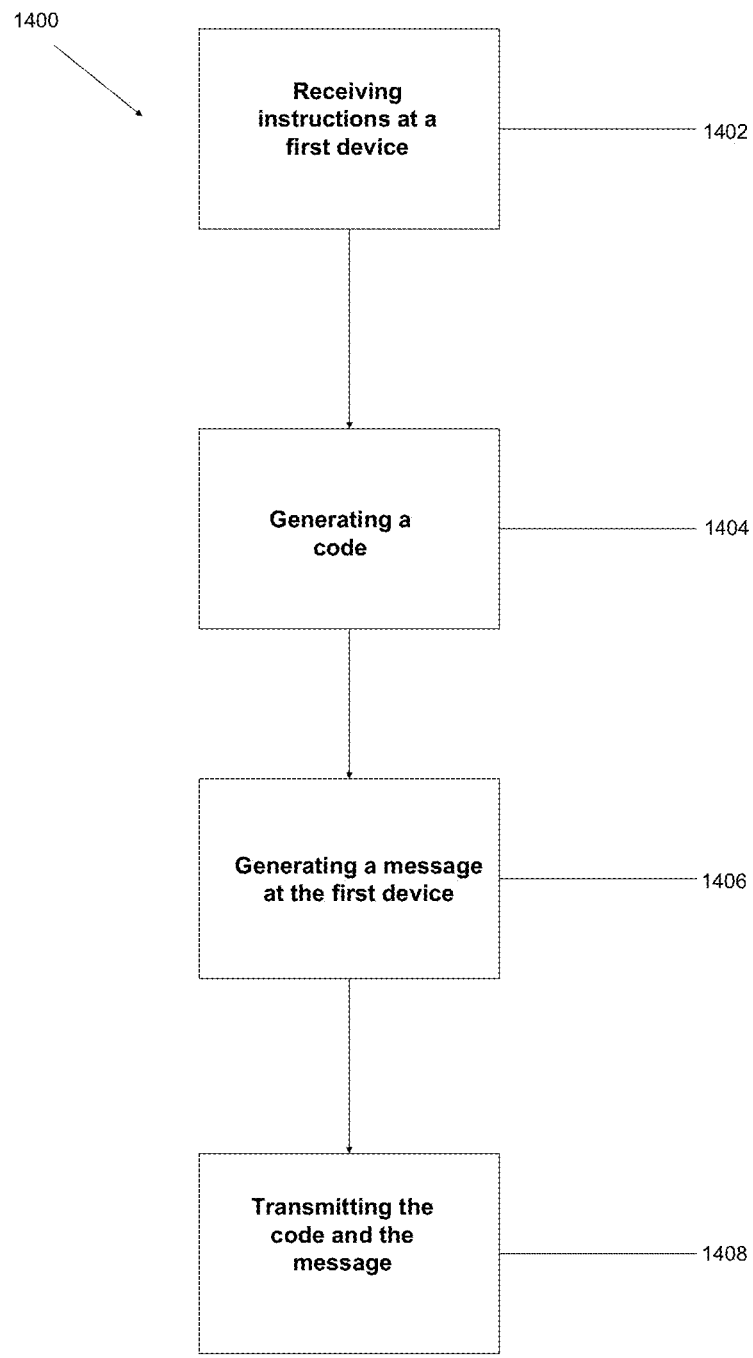
FIG. 14 shows a flowchart of a method in accordance with aspects of the disclosure.

As shown in FIG. 14, in accordance of an aspect of the disclosure, a method 1400 may be provided comprising, in step 1402, receiving instructions at a first device. The instructions may correspond to an item transaction. The item may be a food product. The item transaction may be selected from the group consisting of an item purchase order, an item gift, an item redemption, and an item promotion. The method may comprise, in step 1404, generating a code based on the instructions received at the first device for the item transaction. The method may comprise, in step 1406, generating a message at the first device. The method may comprise, in step 1408, transmitting the code and the message from the first device to a second device. The message may be selected from the group consisting of a text message, an audio message, a graphic message, and a video message.

Figure 15:
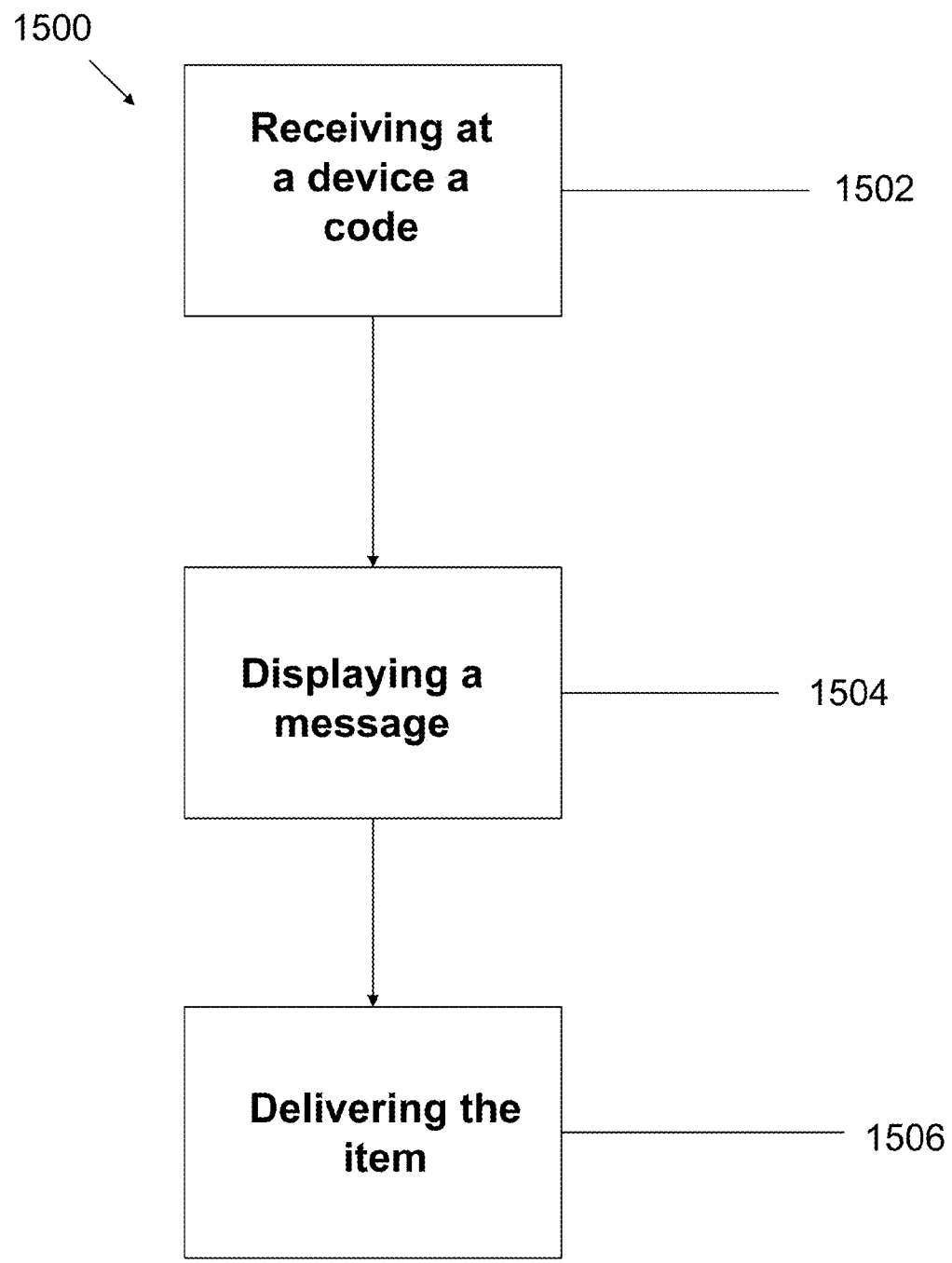
FIG. 15 shows a flowchart of a method in accordance with aspects of the disclosure.

As shown in FIG. 15, a method 1500 may be provided comprising, in step 1502, receiving at a device a code. The code may correspond to instructions for an item transaction. The item transaction may be selected from the group consisting of an item purchase order, an item gift, an item redemption, and an item promotion. The item may be a food product. The method may comprise, based on the received code, in step 1504, displaying a message, and, in step 1506, delivering the item, or item gift, item redemption, or item promotion.

Figure 16:
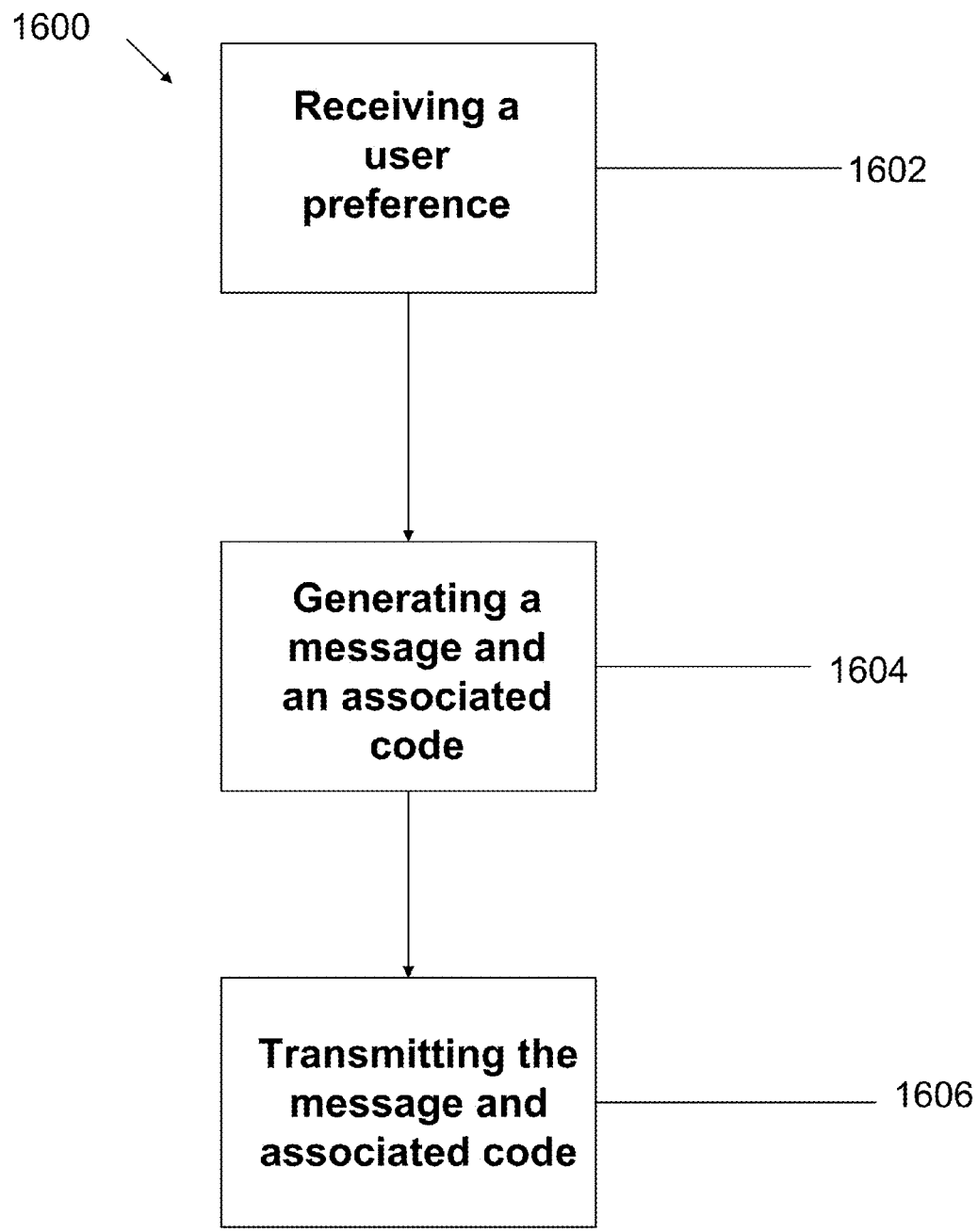
FIG. 16 illustrates a flowchart of a method in accordance with aspects of the disclosure.

As shown in FIG. 16, a method 1600 may be provided comprising, in step 1602, receiving a user preference at a social media computer. The method may comprise, in step 1604, automatically generating a message and an associated code based on the user preference. The method may comprise, in step 1606, automatically transmitting the message and the associated code to the user. The message and the associated code may correspond to an item transaction, e.g., an item gift, and item promotion, and an item discount.

Figure 17:
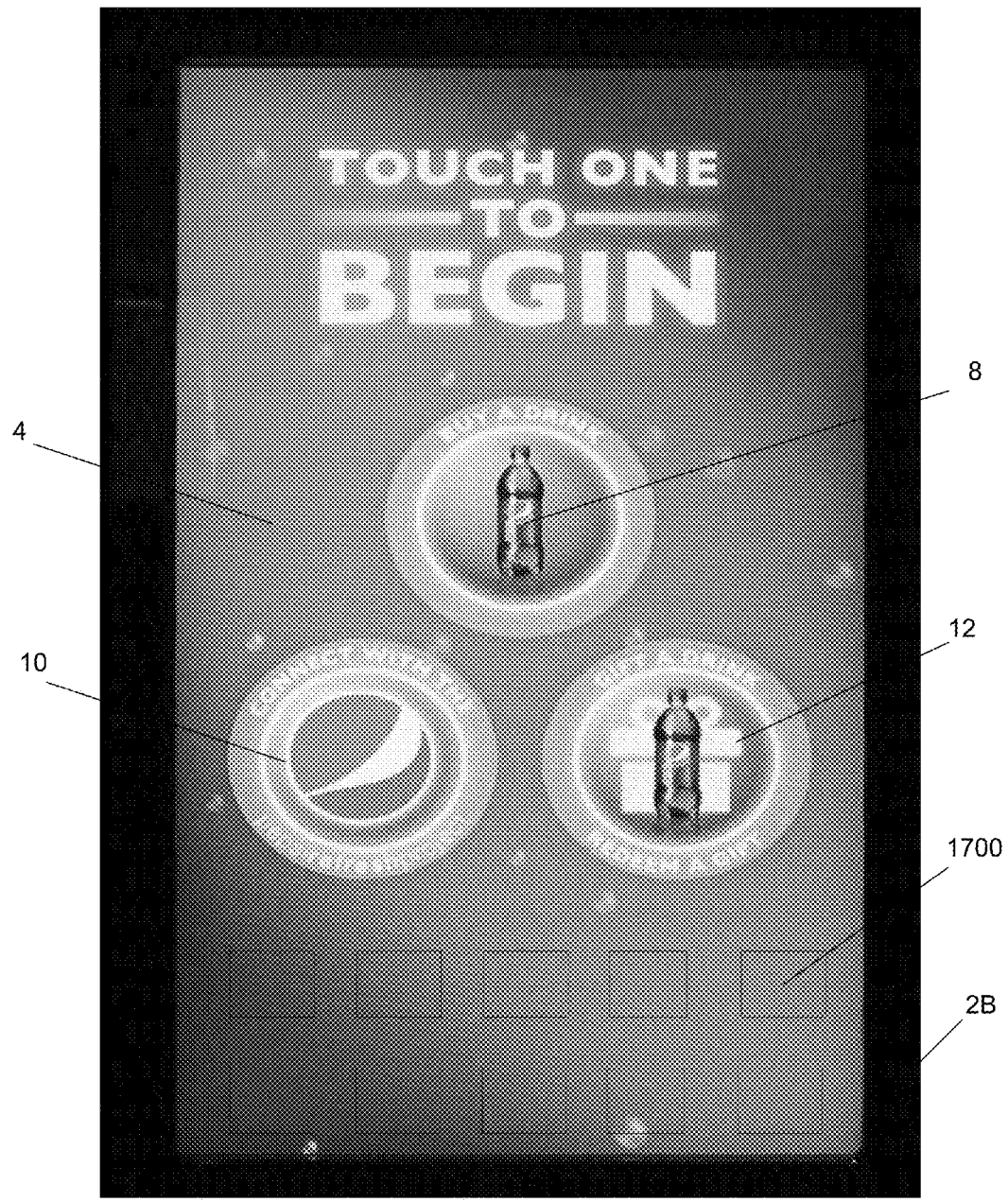
FIG. 17 illustrates a user interface including a screen display, which may be used to implement various aspects of the disclosure.

FIG. 17 illustrates communication device 2B in accordance with an aspect of the disclosure. As previously disclosed, communication device 2B may be the same as or similar to communication device 2A. As shown in FIG. 17, communication device 2B may provide a screen display 4 that includes an icon 1700. Those of skill in the art will recognize that in accordance with the disclosure, icon 1700 may comprise one or more icons, each of which may provide a user with a touch screen icon that permits the user to choose a feature or features provided by the system as previously discussed. For example, but not by way of limitation, icon 1700 may comprise an icon indicating a "healthy" option or choice that a user may select if desired. Thus, communication device 2B may be configured to comprise a user interface (UI) comprising icon 1700, wherein the user interface may provide a separate option for healthy food options or choices, including beverage options or choices. Such healthy food choices may include "better-for-you" (BFY) products, and having a separate healthy option at a user interface in the form of icon 1700 may make selection of healthy food products easier for a user. In an aspect, a system may be configured to display nutritional information for products, including products available at a communication device 2B or a dispenser that may correspond to the user interface, such as in the form of icon 1700.

As another example, icon 1700 may comprise an icon that corresponds to a health-related computer application and/or equipment, e.g., automatic calorie tracking integration. Thus, if a user touches such an icon, the system will communicate with or allow the user to communicate with and/or open a health-related computer application and/or equipment, e.g., automatic calorie tracking integration. Thus, the user may send or instruct the communication device 2B to communicate with a health-related computer application and/or equipment, e.g., automatic calorie tracking integration, with respect to a beverage that the user has ordered or selected.

As another example, icon 1700 may comprise an icon that corresponds to a "favorite," e.g., but not limited to a "favorite team" or "favorite celebrity" or "favorite movie." A user who touches a "favorite" icon may then be shown a screen wherein a user may select or type their "favorite," and then be taken to a webpage that may indicate information, news, and/or favorite food products, e.g., beverage(s), of the selected "favorite." An icon may be provided at the webpage wherein the user may select the favorite food product, e.g., a beverage, and thus order the food product.

As another example, icon 1700 may comprise an icon that corresponds to a "Your favorite." A user who touches a "Your favorite" icon may then be shown a screen wherein a user can convey user identification information and/or may select a particular custom free-flowing food item, such as a beverage having a lemon flavoring and an orange flavoring. The user may then order the beverage from the system, gift the item to another person, and/or receive a receipt, e.g., an electronic receipt on their mobile device, or a printed receipt from the system.

Those of skill in the art will recognize that, in accordance with the disclosure, a wide variety of icons 1700 may be provided as desired.

The disclosure herein has been described and illustrated with reference to the embodiments of the figures, but it should be understood that the features of the disclosure are susceptible to modification, alteration, changes or substitution without departing significantly from the spirit of the disclosure. For example, the dimensions, number, size and shape of the various components may be altered to fit specific applications. Accordingly, the specific embodiments illustrated and described herein are for illustrative purposes only and the disclosure is not limited except by the following claims and their equivalents.

We claim:

1. A method comprising:
   receiving instructions at a first device from a first user, the instructions corresponding to an item transaction, the item being a food product comprising a beverage and the item transaction comprising an item gift;
   generating a code by a processor based on the instructions received at the first device for the item transaction;
   generating a personalized message from the first user through a user interface at the first device;
   transmitting the code and the personalized message from the first device to a second device of a second user;
   providing a beverage dispenser location application to the second user for installation on a mobile device of the second user;
   transmitting, via the beverage dispenser location application, to the second user the location of the beverage dispenser nearest the mobile device of the second user;
   reading the code by a reader, wherein the reader corresponds to a beverage dispenser; and
   dispensing of the item by the beverage dispenser, wherein the first device is selected from the group consisting of a kiosk terminal, a social media computer, a computer terminal, and a mobile device, wherein the code corresponds to instructions for dispensing of the item by the dispenser.

2. The method of claim 1, further comprising receiving at a third device the generated code, and based on receipt of the generated code displaying the personalized message and delivering the item gift.

3. The method of claim 2, wherein the third device is the first device.

4. The method of claim 1, wherein the code is selected from the group consisting of a number code, an alphanumeric code, and a code detectable by the reader, wherein the reader is a scanner.

5. The method of claim 1, wherein the first device comprises an interface, the interface selected from the group consisting of a touch screen interface, a keyboard interface, a voice recognition interface, and a gesture-recognition interface.

6. A method comprising:
   generating by a processor a code, the code corresponding to instructions for an item transaction from a first user, the item comprising a beverage and the item transaction being an item gift;
   receiving the code at a device;
   based on the received code, displaying a personalized message from the first user and delivering the item gift;
   providing a beverage dispenser location application to a second user for installation on a mobile device of the second user; and
   transmitting, via the beverage dispenser location application, to the second user the location of the beverage dispenser nearest the mobile device of the second user;
   reading the code by a reader, wherein the reader corresponds to a beverage dispenser; and
   dispensing of the item by the beverage dispenser corresponding to the code, wherein the device is selected from the group consisting of a kiosk terminal, a social media computer, a computer terminal, and a mobile device.

7. The method of claim 6, wherein the reader is a scanner.

8. The method of claim 7, further comprising automatically dispensing of the item from the beverage dispenser upon detecting of the code by the scanner.

9. The method of claim 6, wherein the received code is a first code, the method further comprising placing a second code on a cup, the second code corresponding to the first code, detecting the second code on the cup when the cup is placed under a nozzle of the beverage dispenser, and dispensing into the cup the item corresponding to the second code by the beverage dispenser.

10. The method of claim 9, wherein the first code is the same as the second code.

11. The method of claim 9, wherein the second code is selected from the group consisting of a bar code, an ultraviolet ink code, and an RFID code.

12. The method of claim 6, wherein the code is selected from the group consisting of a number code, an alphanumeric code, and a code detectable by the reader, wherein the reader is a scanner.

13. The method of claim 6, wherein the device comprises an interface, the interface selected from the group consisting of a touch screen interface, a keyboard interface, a voice recognition interface, and a gesture-recognition interface.

14. The method of claim 6, further comprising placing the code on a cup, detecting the code on the cup by the reader when the cup is placed under a nozzle of the beverage dispenser, and dispensing into the cup the item corresponding to the code.

15. A method comprising:
   receiving a user preference at a social media computer;
   automatically generating by a processor a message and an associated code based on the user preference;
   automatically transmitting the message and the associated code to the user, the message and associated code corresponding to an item promotion, wherein the item comprises a beverage and the code is detectable by a reader and corresponds to instructions for dispensing of the item by a beverage dispenser, wherein the reader corresponds to the beverage dispenser;
   providing a beverage dispenser location application to a user for installation on a mobile device of the user; and
   transmitting, via the beverage dispenser location application, to the user the location of the beverage dispenser nearest the mobile device of the user;
   reading the code by the reader; and
   dispensing of the item by the beverage dispenser based on the instructions.

16. The method of claim 15, wherein the message is selected from the group consisting of a text message, an audio message, a graphic message, and a video message.

17. The method of claim 15, wherein the step of automatically transmitting comprises transmitting the message when a mobile device of the user is detected within a predetermined distance of a predetermined location.

18. An apparatus comprising:
   a first device, the first device comprising
   a transmitter;
   a receiver configured to receive instructions corresponding to an item transaction from a first user, the item being a food product comprising a beverage and the item transaction being an item gift;
   a memory;
   a processor, the processor coupled to the memory for executing instructions comprising:
      generating a code based on the instructions received at the first device for the item transaction from the first user;
      generating a personalized message from the first user through a user interface at the first device; and automatically transmitting the code and the personalized message from the device to a second device of a second user;

automatically transmitting a location of a beverage dispenser nearest a mobile device of the second user, wherein the code is detectable by a reader, wherein the first device is selected from the group consisting of a kiosk terminal, a social media computer, a computer terminal, and a mobile device;

a reader configured to read the code; and a beverage dispenser configured to dispense the beverage in accordance with the code read by the reader, wherein the reader corresponds to the beverage dispenser.

19. An apparatus comprising a social media computer, the social media computer comprising a memory, and a processor, the processor coupled to the memory for executing instructions comprising:

receiving a user preference at the social media computer;

automatically generating a message and an associated code based on the user preference;

automatically transmitting the message and the associated code to the user and location of a beverage dispenser nearest a mobile device of the user, the message and associated code corresponding to an item promotion; and a reader configured to read the code; and a beverage dispenser configured to dispense the food item in accordance with the code read by the reader, wherein the reader corresponds to the beverage dispenser.

20. The apparatus of claim 19, wherein the message is selected from the group consisting of a text message, an audio message, a graphic message, and a video message.

21. The apparatus of claim 19, further comprising a controller, the controller configured to dispense an appropriate amount of at least two beverage ingredients to a dispenser head of the beverage dispenser in accordance with the code read by the reader.

22. The method of claim 15, wherein the code is selected from the group consisting of a number code, an alphanumeric code, and a code detectable by a reader, wherein the reader is a scanner.

23. The apparatus of claim 18, wherein the code is selected from the group consisting of a number code, an alphanumeric code, and a code detectable by a reader, wherein the reader is a scanner.

24. The apparatus of claim 18, wherein the personalized message is selected from the group consisting of a text message, an audio message, a graphic message, and a video message.

* * * * *